(12) United States Patent
Furukawa et al.

(10) Patent No.: US 6,644,272 B2
(45) Date of Patent: Nov. 11, 2003

(54) DIESEL ENGINE

(75) Inventors: Hideo Furukawa, Oyama (JP); Tooru Okazaki, Oyama (JP); Hiroyasu Sato, Oyama (JP); Takashi Sakasai, Oyama (JP)

(73) Assignee: Komatsu Ltd., Tokyo (JP)

( * ) Notice: Subject to any disclaimer, the term of this patent is extended or adjusted under 35 U.S.C. 154(b) by 49 days.

(21) Appl. No.: 10/095,018

(22) Filed: Mar. 12, 2002

(65) Prior Publication Data

US 2002/0129789 A1 Sep. 19, 2002

(30) Foreign Application Priority Data

Mar. 13, 2001 (JP) .................................. 2001-070205
Sep. 7, 2001 (JP) .................................. 2001-272590

(51) Int. Cl.$^7$ ............................................. F02M 15/02
(52) U.S. Cl. .................. 123/378; 123/542; 123/179.18; 123/142.5 R
(58) Field of Search ............................. 123/378, 542, 123/179.18, 142.5 R

(56) References Cited

U.S. PATENT DOCUMENTS 4,665,319 A * 5/1987 Seepe et al. .................. 290/3

FOREIGN PATENT DOCUMENTS

| JP | 56-056939 | 5/1981 |
|---|---|---|
| JP | 04-232346 | 8/1992 |
| JP | 05-141282 | 6/1993 |

* cited by examiner

Primary Examiner—Erick Solis
(74) Attorney, Agent, or Firm—Armstrong, Westerman & Hattoi, LLP

(57) ABSTRACT

A diesel engine (1) has: a flow adjuster (10) for throttling exhaust flow; an intake heater (71) for heating intake air; a thermal medium circulator (72) for circulating a thermal medium to warm the diesel engine (1); a cylinder cut-off device (73) for conducting cylinder cut-off; and a fuel injection timing advancing device (74) for advancing timing for supplying fuel to a cylinder, the respective devices being actuated at least from pre-high-idle step to a neighborhood of high-idle condition, so that fuel combustion stabilization of the diesel engine (1) can be rapidly enhanced during a period where less fuel is supplied into the cylinder and fuel combustion time is short, thus greatly reducing discharge of white smoke and possibility of engine bunching.

32 Claims, 18 Drawing Sheets

DIESEL ENGINE

BACKGROUND OF THE INVENTION

1. Field of the Invention

The present invention relates to a diesel engine.

2. Description of Related Art

Conventionally, a flow adjuster for adjusting the flow of intake air or exhaust is provided at the halfway of intake channel or exhaust channel of a diesel engine to throttle the intake flow or the exhaust flow, thereby accelerating warm-up operation in starting engine.

Specifically, when intake flow is throttled by the flow adjuster, the intake air supplied from the outside into the cylinder of the diesel engine and the exhaust discharged from the cylinder is decreased, less heat quantity is lost by the intake-air of which temperature is low as compared to the temperature in the cylinder, and more heat quantity can be given in the cylinder by the exhaust, so that the in-cylinder temperature can be easily raised, thereby accelerating ignition and complete combustion of the fuel.

On the other hand, when the exhaust flow is throttled by the flow adjuster, more high-temperature exhaust can be retained in the cylinder without being discharged and the intake air supplied into the cylinder can be decreased as in throttling the intake air, the inside of the cylinder can be warmed by the temperature of the exhaust and less heat quantity is lost by the intake air, so that in-cylinder temperature can be easily raised and ignition and complete combustion of the fuel can be enhanced.

In the above-described diesel engine, the intake air or exhaust is throttled by the flow adjuster in starting the engine and the throttle of the intake air or the exhaust is released after starting the engine.

However, when no load or small load is applied to the engine after starting the engine where engine speed is high as compared to engine start time, small amount of fuel is supplied into the cylinder on account of small load and combustion time per one time for respective cylinders becomes short on account of high engine speed.

Accordingly, when no or small load is applied to the engine after starting the engine, ignition and complete combustion of fuel are difficult to be caused, and all the cylinders are not ignited, thus causing engine hunching and discharge of non-combusted fuel from the cylinder as white smoke.

Especially, when diesel engine is used as a motor of construction equipment or power generator, diesel engine is often operated in high-idle condition where no load or small load is applied to the engine and engine speed is extremely high. Under such condition, engine hunching and white smoke are likely to be generated.

Further, when a diesel engine is started in cold area or time, since the inside of the cylinder is extremely cold and the temperature of the intake air is substantially low, the possibility of engine hunching and discharge of white smoke are further increased.

Further, in a diesel engine having an intake air charger, the compression ratio is often set smaller than a diesel engine having no intake air charger in order to increase charged air pressure ratio thereof. In this case, the in-cylinder temperature is further difficult to be increased on account of small compression ratio and ignition of fuel and complete combustion are difficult to be occurred. Accordingly, all-cylinder ignition becomes difficult and the possibility of engine hunching and white smoke discharge are further increased.

In recent years, through emulsion fuel composed of mixture of fuel and water has come to be used for decreasing toxic substance in the exhaust such as nitrogen oxide, so-called NOx, of the diesel engine, such emulsion fuel is inferior in selfignition property on account of water. When such difficult-to-be ignited emulsion fuel is used in an engine, fuel ignition and complete combustion become difficult, thereby causing engine hunching and white smoke discharge.

SUMMARY OF THE INVENTION

An object of the present invention is to reduce the possibility of engine hunching and to greatly decrease the discharge of white smoke in a diesel engine.

Incidentally, the term of first to ninth predetermined periods are used in the description of the present invention, of which meaning will be easily understood with reference to FIG. 18.

In order to achieve an object of the present invention, a diesel engine according to an aspect of the present invention includes: a combustion stabilization assist for enhancing stabilization of combustion of fuel supplied into a combustion chamber, the combustion stabilization assist being actuated for a predetermined period in accordance with operating condition of the diesel engine, in which the predetermined period is either one of a first predetermined period from starting the diesel engine until the diesel engine reaches a neighborhood of high-idle condition and a second predetermined period from a pre-high-idle step before the condition of the diesel engine reaches the high-idle condition until the condition of the diesel engine reaches the neighborhood of the high-idle condition.

The high-idle condition refers to a situation that the load applied to the engine is low (including zero) and engine speed is high. The pre-high-idle step may be any time after starting the engine and below the high-idle condition.

The neighborhood of high-idle condition refers to a situation that the load applied to the engine is low (including zero) and the engine speed is around the high-idle rotation speed, where the engine speed may approximately coincide with the high-idle rotation speed, may be slightly lower than the high-idle rotation speed, or may be slightly higher than the high-idle rotation speed.

Accordingly to the above arrangement, since the combustion stabilization assist is actuated during either one of the first predetermined period and the second predetermined period, the combustion stabilization assist is actuated at least from the pre-high-idle step until the neighborhood of the high-idle condition of the diesel engine. In other words, since the combustion stabilization assist is actuated during the period where the fuel amount supplied into the combustion chamber is low on account of zero load or low load applied to the diesel engine and fuel combustion time is short on account of high engine speed, the fuel combustion during the period can be enhanced. Accordingly, even when the fuel amount supplied into the combustion chamber is small and combustion time is short, ignition and complete combustion of the fuel can be enhanced, thereby greatly reducing the possibility of engine hunching and white smoke discharge.

Further, when the first predetermined period is used as the predetermined period, the combustion stabilization assist is actuated from the start of the engine. In other words, since the combustion stabilization assist is actuated when the fuel amount supplied into the combustion chamber is small on account of zero or low load applied to the engine and the temperature inside the combustion chamber is low, the ignition and complete combustion of the fuel can be sufficiently enhanced, thereby improving startability of the diesel engine.

A diesel engine according to another aspect of the present invention includes: a combustion stabilization assist for enhancing stabilization of combustion of fuel supplied into a combustion chamber, the combustion stabilization assist being actuated for a predetermined period in accordance with operating condition of the diesel engine, in which the predetermined period is either one of a third predetermined period from starting the diesel engine until a predetermined time has elapsed after the diesel engine reaches a high-idle condition and a fourth predetermined period from a pre-high-idle step before the condition of the diesel engine reaches the high-idle condition until a predetermined time has elapsed after the diesel engine reaches the high-idle condition, and/or either one of a fifth predetermined period from starting the diesel engine until a predetermined load is applied to the engine after the diesel engine reaches the high-idle condition and a sixth predetermined period from a pre-high-idle step before the condition of the diesel engine reaches the high-idle condition until a predetermined load is applied to the engine after the diesel engine reaches the high-idle condition.

According to the above arrangement, since the combustion stabilization assist is actuated during at least one of the periods of the third to the sixth predetermined periods, the combustion stabilization assist is actuated at least from the pre-high-idle step of the diesel engine to the neighborhood of the high-idle condition, so that the ignition and complete combustion of the fuel can be enhanced and the possibility of engine hunching and white smoke discharge can be greatly reduced as in the case of adopting the above first and the second predetermined periods as the predetermined period.

Further, when at least one of the third and the fifth predetermined periods is used as the predetermined period, the combustion stabilization assist is actuated from the start of the engine, so that ignition and complete combustion of the fuel can be sufficiently enhanced as in the case of adopting the first predetermined period as the predetermined period, thereby improving the startability of the diesel engine.

When the third or the fourth predetermined period is adopted as the predetermined period, since the combustion stabilization assist is actuated until a predetermined time is elapsed after the diesel engine reaches the high-idle condition, the combustion stabilization assist can be actuated for a substantially long time. Accordingly, since the diesel engine is sufficiently warmed up, the ignition and complete combustion of the fuel can be sufficiently enhanced and engine hunching and discharge of white smoke can be prevented.

On the other hand, when the fifth or the sixth predetermined period is adopted as the predetermined period, since the combustion stabilization assist is actuated until more than predetermined load is applied to the engine after the diesel engine reaches the high-idle condition, the combustion stabilization assist can be actuated until the engine is substantially warmed by increasing amount of the fuel supplied into the combustion chamber. Accordingly, the diesel engine can be sufficiently warmed up, so that ignition and complete combustion of the fuel can be sufficiently enhanced, thereby preventing engine hunching and discharge of white smoke.

When the combination of the third and the fifth predetermined periods or the combination of the fourth and the sixth predetermined periods are adopted as the predetermined period, the end time of the actuation of the combustion stabilization assist is defined by both of the time and the load applied to the engine. In this case, since the actuation of the combustion stabilization assist is stopped when more than predetermined load is applied to the diesel engine even when the predetermined time has not elapsed after reaching the high-idle condition, the combustion stabilization assist can be immediately stopped when the load is applied immediately after reaching the high-idle condition to increase the fuel amount supplied into the combustion chamber so that the engine is sufficiently warmed requiring no warm-up operation, thereby preventing the temperature of the engine from being excessively raised. On the other hand, since the actuation of the combustion stabilization assist is stopped after a predetermined time is elapsed even when more than predetermined load is not applied after the diesel engine reaches the high-idle condition, the combustion stabilization assist can be immediately stopped when the high-idle condition has continued for a predetermined time and the engine is sufficiently warmed to require no warm-up operation, thereby preventing the temperature of the engine from being excessively raised.

A diesel engine according to still another aspect of the present invention includes a combustion stabilization assist for enhancing stabilization of combustion of fuel supplied into a combustion chamber, the combustion stabilization assist being actuated for a predetermined period in accordance with operating condition of the diesel engine, in which the predetermined period is a seventh predetermined period from before starting the diesel engine until the diesel engine reaches a neighborhood of high-idle condition.

When the seventh predetermined period is adopted as the predetermined period, since the combustion stabilization assist is actuated at least from the pre-high-idle step until the neighborhood of the high-idle condition of the diesel engine, ignition and complete combustion of the fuel can be enhanced and the possibility of engine hunching and discharge of white smoke can be greatly diminished as in the case of adopting the above first and the second predetermined periods as the predetermined period. Further, when the seventh predetermined period is adopted as the predetermined period, the combustion stabilization assist is actuated from the start of the engine, the ignition and complete combustion of the fuel can be sufficiently enhanced, thereby improving startability of the diesel engine as in the case of adopting the first predetermined period as the predetermined period.

Further, when the seventh predetermined period is used as the predetermined period, since the combustion stabilization assist is actuated before starting the engine, the temperature inside the combustion chamber, the intake air etc. can be raised before starting the engine, so that ignition properties and flammability of the fuel can be enhanced from the initial stage of the start of the engine, thereby further improving the startability of the diesel engine.

A diesel engine according to further aspect of the present invention includes a combustion stabilization assist for enhancing stabilization of combustion of fuel supplied into a combustion chamber, the combustion stabilization assist being actuated for a predetermined period in accordance with operating condition of the diesel engine, in which the predetermined period is an eighth predetermined period from before starting the diesel engine until a predetermined time has elapsed after the diesel engine reaches a high-idle condition and/or a ninth predetermined period from before starting the diesel engine until a predetermined load is applied to the engine after the diesel engine reaches the high-idle condition.

When at least one of the eighth and the ninth predetermined periods is used as the predetermined period, the combustion stabilization assist is actuated from the pre-high-idle step until the diesel engine reaches the neighborhood of the high-idle condition, so that ignition and complete combustion of the fuel can be sufficiently enhanced as in the case of adopting the first and the second predetermined periods as the predetermined period, thereby greatly reducing the possibility of engine hunching and discharge of white smoke.

When at least one of the eighth and the ninth predetermined periods is adopted as the predetermined period, since the combustion stabilization assist is actuated from the start of the engine, ignition and complete combustion of the fuel can be sufficiently enhanced as in the case of adopting the first predetermined period as the predetermined period, thereby improving the startability of the diesel engine.

When the eighth predetermined period is adopted as the predetermined period, since the combustion stabilization assist is actuated until a predetermined time is elapsed after the diesel engine reaches the high-idle condition, the diesel engine is sufficiently warmed up as in the case of adopting the third and the fifth predetermined periods as the predetermined period, the ignition and complete combustion of the fuel can be sufficiently enhanced and engine hunching and discharge of white smoke can be prevented.

On the other hand, when the ninth predetermined period is adopted as the predetermined period, since the combustion stabilization assist is actuated until more than predetermined load is applied to the engine after the diesel engine reaches the high-idle condition, the combustion stabilization assist can be actuated until the engine is substantially warmed by increasing the amount of the fuel supplied into the combustion chamber as in the case of adopting the fifth and the sixth predetermined periods as the predetermined period. Accordingly, the diesel engine can be sufficiently warmed up, so that ignition and complete combustion of the fuel can be sufficiently enhanced, thereby preventing engine hunching and discharge of white smoke.

When the combination of the eighth and the ninth predetermined periods is adopted as the predetermined period, the end time of the actuation of the combustion stabilization assist is defined by both of the time and the load applied to the engine. Accordingly, the combustion stabilization assist can be immediately stopped when no warm-up operation becomes required as in the case of adopting the combination of the third and the combination of the fifth predetermined periods and the fourth and the sixth predetermined periods, thereby preventing the temperature of the engine from being excessively raised.

When one of the eighth and the ninth predetermined periods is adopted as the predetermined period, since the actuation of the combustion stabilization assist is actuated before starting the engine, the temperature inside the cylinder or the temperature of the intake air can be raised before starting the engine as in the case of adopting the seventh predetermined period as the predetermined period, so that the ignition properties and flammability of the fuel can be enhanced from the initial stage of starting the engine, thus further improving the startability of the diesel engine.

In the above arrangements of the diesel engine, the combustion stabilization assist may preferably include a flow adjuster provided at the halfway of an intake channel or an exhaust channel of the diesel engine for adjusting a flow of an intake air or an exhaust flowing through the channels and a flow adjustment controller for controlling the operation of the flow adjuster.

According to the above arrangement, since the operation of the flow adjuster is controlled so that the flow of the intake air or the exhaust is throttled during the predetermined periods, much exhaust can be reserved inside the combustion chamber and the amount of the intake air supplied into the combustion chamber can be reduced. Accordingly, even when the amount of the fuel supplied into the combustion chamber is small, the heat quantity taken away by the intake air of which temperature is normally low as compared to the temperature inside the combustion chamber and the heat quantity given to the inside of the combustion chamber by the exhaust can be increased, so that the temperature inside the combustion chamber can be easily raised and ignition and complete combustion of the fuel can be enhanced.

When the combustion stabilization assist including the flow adjuster and the flow adjustment controller is used, the pre-high-idle step of the high-idle condition may preferably be set when a rotation speed of the engine becomes an approximately middle-rotation speed between a low-idle rotation speed and high-idle rotation speed of the diesel engine.

When the rotation speed of the diesel engine is higher than the engine rotation speed approximately in the middle of the speed during low-idle condition and the speed during the high-idle condition, the exhaust flow from the engine is increased and exhaust speed gets higher. By throttling the exhaust during the period when the exhaust speed is high, impurities such as carbon in the exhaust is flowed being urged by the exhaust to be unlikely to be caught in the flow adjuster, cleaning efficiency around the flow adjuster can be reduced.

In the above-arranged diesel engine, a combustion stabilization assist may preferably include an intake heater for heating the intake air of the diesel engine.

According to the above arrangement, since the warmed intake air can be supplied into the combustion chamber, the combustion chamber can be warmed by the intake air, so that ignition and complete combustion of the fuel can be enhanced.

Alternatively, the combustion stabilization assist may preferably include: a temperature adjuster for adjusting the temperature of the diesel engine by circulating a thermal medium; a thermal medium heater for heating the thermal medium of the temperature adjuster; a flow-path opener/shutter for opening and shutting a flow-path of the thermal medium of the temperature adjuster; and a flow-path open/shut controller for controlling the operation of the flow-path opener/shutter so that the flow-path of the thermal medium is opened during the predetermined period.

According to the above arrangement, since the operation of the flow-path opener/shutter is controlled by the flow-path open/shut controller during the predetermined period so that the flow-path of the thermal medium is opened, the thermal medium heated by the thermal medium heater is circulated to warm the diesel engine. Accordingly, the combustion chamber and the intake air etc. supplied to the combustion chamber can be warmed, so that ignition and complete combustion of the fuel can be enhanced.

When the combustion stabilization assist includes the temperature adjuster, the thermal medium heater, the flow-path opener/shutter and the flow-path open/shut controller, the flow-path open/shut controller may preferably control the operation of the flow-path opener/shutter so that the flow-path of the thermal medium is opened when a load applied to the engine is low and the flow-path of the thermal medium is shut when the load applied to the engine is high.

Accordingly, when the amount of the fuel supplied into the combustion chamber is small and the temperature inside the combustion chamber is low on account of low load applied to the engine, the diesel engine can be warmed by circulating the heated thermal medium thereby enhancing ignition and complete combustion of the fuel. On the other hand, when the amount of the fuel supplied into the combustion chamber is great and the temperature inside the combustion chamber is high on account of high load applied to the engine, the flow-path of the thermal medium is shut to stop circulation of the thermal medium, thereby preventing the temperature of the diesel engine from being excessively raised by the thermal medium. Further, since the air density of the intake air is not lowered because the thermal medium does not heat the diesel engine, i.e. does not heat the intake air, the flow of the intake air supplied into the combustion chamber is not reduced and decrease in the output of the diesel engine can be avoided.

Further, the diesel engine may preferably include a plurality of combustion chambers, and the combustion stabilization assist may preferably have a function for stopping fuel supply to a part of combustion chamber of the plurality of combustion chambers.

According to the above arrangement, the fuel supply to the part of the combustion chamber is stopped by the combustion stabilization assist during the predetermined period. In this case, since the explosive force from the part of the combustion chamber cannot be obtained, the load applied to the diesel engine is increased. Then, the diesel engine increases the amount of the fuel supplied to the rest of the combustion chambers in response to the increase in the load, so that the temperature of the exhaust is raised to raise the temperature inside the combustion chamber, thereby enhancing ignition and complete combustion of the fuel.

Alternatively, the combustion stabilization assist may preferably have a function for advancing a timing for supplying fuel to the combustion chamber to be earlier than the a timing for supplying fuel during loaded operation mode of the diesel engine.

According to the above arrangement, the fuel supply timing to the combustion chamber is advanced by the combustion stabilization assist to be earlier than the fuel supply timing of the loaded operation mode of the diesel engine during the predetermined period.

Ordinarily, in a diesel engine, the fuel injection timing is controlled in accordance with engine speed, where retard timing control of the fuel supply timing is often conducted in the engine speed area of loaded operation mode (an operation mode working as a motor) of which operation time is long, in order to reduce NOx in compliance with exhaust gas restriction. In such loaded operation mode, since the amount of the fuel supplied into the combustion chamber is great and the inside of the combustion chamber is sufficiently warm, ignition and complete combustion of the fuel can be conducted well.

However, since the above retard timing control is conducted in accordance with the engine speed, when the rotation speed area of the loaded operation mode is approximately coincident with, for instance, the rotation speed during high-idle operation of the diesel engine, the retard timing control of the fuel supply timing is conducted in the neighborhood of the high-idle condition. Accordingly, the fuel supply timing is retarded even when the amount of the fuel supplied into the combustion chamber is small and the combustion chamber is not sufficiently warmed, so that ignition and complete combustion of the fuel may not be sufficiently conducted, thereby increasing the discharge of white smoke.

In the present arrangement, since the fuel supply timing into the combustion chamber is advanced to be earlier than the loaded operation mode of the diesel engine at least from the pre-idle step of the diesel engine to the neighborhood of the high-idle condition by the combustion stabilization assist, ignition and complete combustion of the fuel can be conducted well, thereby securely reducing discharge of white smoke.

In the above-described diesel engine, when fuel of inferior autoignition properties, such as emulsion fuel in which water and fuel is mixed in emulsion, waste plastic decomposition oil, methanol fuel etc. is used, since the ignition properties can be greatly enhanced, the present invention can be suitably applied.

DETAILED DESCRIPTION OF PREFERRED EMBODIMENT(S)

Preferred embodiments of the present invention will be described below with reference to attached drawings.

[First Embodiment]

Figure 1:
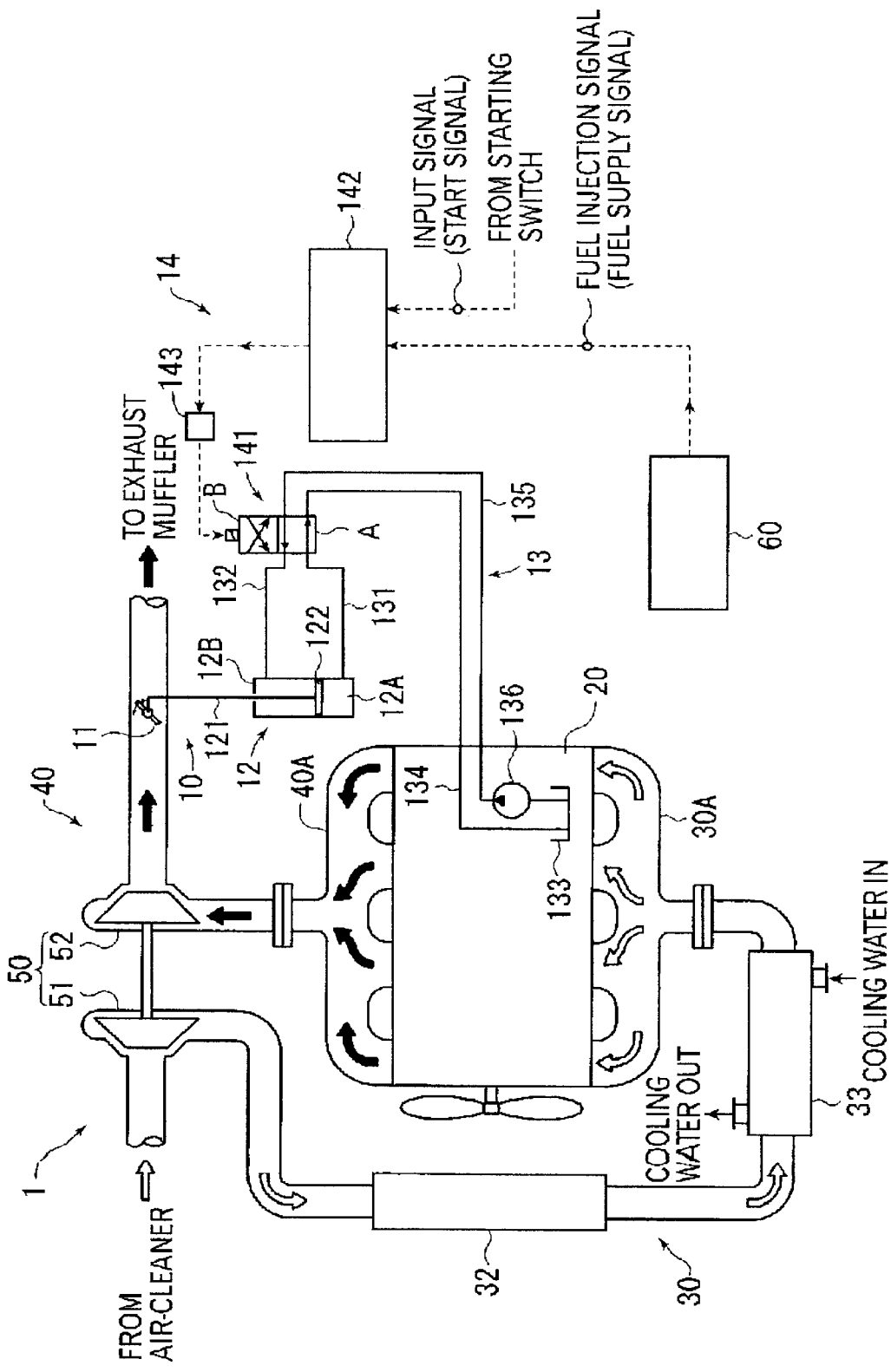
FIG. 1 is a schematic diagram showing a diesel engine according to first embodiment of the present invention.

FIG. 1 shows a diesel engine 1 according to first embodiment of the present invention. The diesel engine 1 is provided with a flow adjuster 10 for throttling exhaust flow thereof.

The diesel engine 1 is an internal combustion engine for generating drive force by igniting the fuel injected into compressed high-temperature air, which includes an engine body 20 having a plurality of cylinders (not shown), an intake channel 30 for inhaling air to the respective cylinders, an exhaust channel 40 for discharging exhaust in the respective cylinders and an intake air charger 50 for supercharging.

The diesel engine 1 is an engine using water-emulsion fuel for reducing the amount of NOx in the exhaust gas. The water-emulsion fuel may be a mixture of water, light oil and surface active agent, a mixture of water, heavy oil and surface active agent etc.

In the engine body 20 of the diesel engine 1, intake manifold 30A constituting the intake channel 30 and an exhaust manifold 40A constituting the exhaust channel 40 are respectively connected through a cylinder head (not shown).

Air cleaner (not shown) for removing dust etc. in the intake air, air-cooled charged air cooler 32 and water-cooled charged air cooler 33 are provided in the intake channel 30.

A compressor 51 of the intake air charger 50 is provided at the halfway of the piping connecting the air cleaner and the air-cooled charged air cooler 32. The intake air introduced from the air cleaner to the compressor 51 is compressed by the compressor 51 and is sequentially introduced to the air-cooled charged air cooler 32 and the water-cooled charged air cooler 33.

The air-cooled charged air cooler 32 and the water-cooled charged air cooler 33 cool the intake air of which temperature is raised by being compressed by the compressor 51. Further, according to operating condition of the diesel engine 1, the intake air excessively cooled by the air-cooled charged air cooler 32 is warmed by the water-cooled charged air cooler 33. Accordingly, combustion temperature and exhaust temperature can be lowered and efficiently supercharged during high-load operation, and ignition property can be improved and combustion can be stabilized during low-load operation.

The intake air cooled by the after-coolers 32 and 33 is supplied into the respective cylinders through the intake manifold 30A.

An exhaust muffler (not shown) is provided in the exhaust channel 40.

A turbine 52 of the intake air charger is provided at the halfway of the piping connecting the exhaust manifold 40A and the exhaust muffler. The exhaust discharged from the inside of the cylinder of the engine body 20 is discharged to the outside from the exhaust muffler sequentially passing through the inside of the exhaust manifold 40A and the turbine 52 of the intake air charger 50.

Incidentally, the compressor 51 is driven by the exhaust passing through the turbine 52 of the intake air charger 50, and the diesel engine 1 is supercharged.

The flow adjuster 10 has a butterfly valve 11 as a flow adjuster disposed at the halfway of the piping connecting the turbine 52 of the intake air charger 50 and the exhaust muffler in the exhaust channel 40 of the diesel engine 1, the butterfly valve 11 adjusting flow of the exhaust in the exhaust channel 40.

In addition to the butterfly valve 11, the flow adjuster 11 has a hydraulic cylinder 12 for driving the butterfly valve 11, a hydraulic circuit 13 for supplying hydraulic oil to the hydraulic cylinder 12 and a controller 14 for controlling operation of the butterfly valve 11 by controlling the operation of the hydraulic cylinder 12.

The butterfly valve 11 has a circular-plate valve body provided with a rotary shaft, the rotary shaft being rotated to adjust the flow of the exhaust flowing through the piping connecting the turbine 52 of the intake air charger 50 and the exhaust muffler.

A piston 122 sliding inside the hydraulic cylinder 12 is provided, and an end of a rod 121 is fixed to the piston. The other end of the rod 121 is rotatably attached to a lever fixed to a rotary shaft of the butterfly valve 11.

According to the above arrangement, when the hydraulic oil is supplied on a bottom 12A side of the hydraulic cylinder 12, the projection of the rod 121 from the hydraulic cylinder 12 becomes great, so that the rotary shaft of the butterfly valve 11 is rotated and the angle formed by the surface of the circular-plate valve body and the exhaust-flow direction becomes a predetermined angle to close the butterfly valve 11 and throttle the exhaust flow. The predetermined angle is set in accordance with throttling amount of the exhaust, based on which the relationship between the butterfly value 11, and the hydraulic cylinder 12 is determined.

On the other hand, when the hydraulic oil is supplied to the side of a head 12B of the hydraulic cylinder 12, the projection of the rod 121 from the hydraulic cylinder 12 becomes small, so that the rotary shaft of the butterfly valve 11 is rotated and the angle formed by the surface of the circular-plate valve body an the exhaust-flow direction becomes approximately 0 degree to open the butterfly valve 11 to release throttle of the exhaust.

Incidentally, though the butterfly valve 11 is closed when the projection of the rod 121 from the hydraulic cylinder 12 becomes great and the butterfly valve 11 is opened when the projection of the rod 121 becomes small in the present embodiment, the butterfly valve 11 may be opened when the projection of the rod 121 from the hydraulic cylinder 12 becomes great and the butterfly valve 11 may be closed when the projection of the rod 121 becomes small by changing the attitude of the valve body of the butterfly valve 11.

The hydraulic circuit 13 has a bottom channel 131 connected to the side of the bottom 12A of the hydraulic cylinder 12, a head channel 132 connected to the side of the head 12B of the hydraulic cylinder 12, an oil tank 133 provided to the engine body 20 of the diesel engine 1, a drain channel 134 and a supply cannel 135 connected to the oil tank 133 and an oil pump 136 provided at the halfway of the supply channel 135.

Incidentally, the oil pump 136 may be driven by a crankshaft through a timing gear of the diesel engine 1 or, alternatively, may be driven by a motor etc. The oil tank 133 and the oil pump 136 may be, for instance, of lubrication system of the diesel engine, or, when the diesel engine is a motor of a construction equipment, of hydraulic system for driving operating machine etc. of the construction equipment.

A solenoid valve 141 constituting the above-described controller 14 is disposed between the bottom channel 131 and the head channel 132 and between the drain channel 134 and the supply channel 135, the position of the solenoid valve 141 being switched to select which one of the bottom 12A side or the head 12B side of the hydraulic cylinder 12 the hydraulic oil is supplied to.

The solenoid valve 141 has two positions of position (A) and position (B). When the solenoid valve 141 is at the position (A), the bottom channel 131 is connected to the drain channel 134 and the head channel 132 is connected to the supply channel 135, where the hydraulic oil can be supplied to the head 12B of the hydraulic cylinder 12.

On the other hand, when the solenoid valve 141 is at the position (B), the bottom channel 131 is connected to the supply channel 135 and the head channel 132 is connected to the drain channel 134, where the hydraulic oil can be supplied to the bottom 12A of the hydraulic cylinder 12.

The controller 14 has the above-described solenoid valve 141 and a solenoid valve controller 142 for controlling operation of switching two positions of the solenoid valve 141. The position of the solenoid valve 141 is switched by the solenoid valve controller 142 to control the operation of the butterfly valve 11. Incidentally, the solenoid valve controller 142 is electrically connected to the solenoid valve 141 through a relay 143.

The solenoid valve controller 142 determines whether the exhaust flow is throttled or not by the butterfly valve 11 according to operating condition of the diesel engine 1.

In order to detect operating condition of the diesel engine 1, the solenoid valve controller 142 is electrically connected to an engine controller 60 for controlling fuel injection pump etc. into the cylinder of the engine body 20.

Accordingly, a fuel injection quantity signal indicting the amount of fuel injected into the cylinder outputted from the engine controller 60 is inputted to the solenoid valve controller 142.

Incidentally, though not shown, a fuel injection quantity sensor for detecting the amount of fuel injected into the cylinder is provided to the diesel engine 1.

Figure 2:
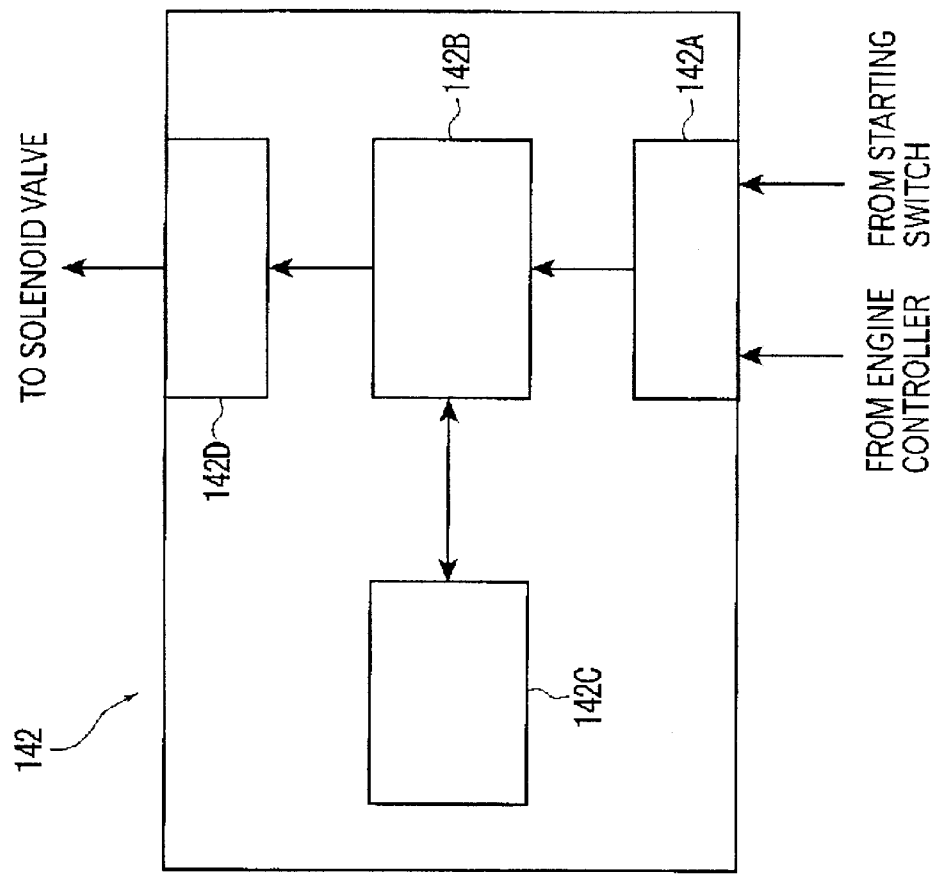
FIG. 2 is a block diagram showing a solenoid valve controller according to the first embodiment of the present invention.

Specifically describing the arrangement of the solenoid valve controller 142, as shown in FIG. 2, the solenoid valve controller 142 has an input portion 142A for the output signal from the engine controller 60 to be inputted, a processor 142B for determining switching position of the solenoid valve 141 in accordance with the signal from the input portion 142A, a storage 142C for storing information necessary for processing operation conducted by the processor 142B, and an output portion 142D for outputting a predetermined signal to the solenoid valve 141 in accordance with the result of processing operation by the processor 142B.

In addition to the output signal from the engine controller 60, a signal outputted from the starting switch of the diesel engine 1 (not shown) is inputted to the input portion 142A. The starting switch is switched on and off to start and stop the diesel engine 1. When the starting switch is turned on, a predetermined signal is inputted to the input portion 142A of the solenoid valve controller 142 from the starting switch.

Before the diesel engine 1 reaches around high-idle rotation speed after being started, since the engine temperature, i.e., the in-cylinder temperature of the engine body 20 is low and the load applied to the diesel engine 1 is low (including no-load) requiring small amount of fuel injection to the cylinder, the operation of the diesel engine 1 is controlled so that the exhaust flow in the exhaust channel 40 is throttled to reserve a part of the exhaust in the cylinder and reduce the intake air inhaled into the cylinder.

Accordingly, the heat quantity given to the inside of the cylinder by the high-temperature exhaust is increased and the heat quantity being taken away from the inside of the cylinder by the low-temperature intake air is reduced, so that the temperature inside the cylinder can be rapidly raised and ignition and complete combustion of fuel can be enhanced.

In other words, the flow adjuster 10 works as a combustion stabilization assist for enhancing stabilization of combustion of the fuel supplied in the cylinder.

Operation of the diesel engine 1 from the start of the engine will be described below with reference to the graph shown in FIG. 3. Incidentally, vertical axis represents engine speed of the diesel engine 1 and horizontal axis represents elapsed time from starting the diesel engine 1.

Initially, when the starting switch is turned on, cranking section A is started where the engine is driven by a starting motor (starter) and the crankshaft is subsequently rotated by igniting and exploding the fuel inside the cylinder (starting so-called self-drive) to terminate the drive by the starting motor. Subsequently, in the low-idle rotation speed section B, the engine is rotated at a predetermined low engine speed, so-called low-idle rotation speed.

After a predetermined time further being elapsed, the speed of the crankshaft is raised from the low-idle rotation speed to be rotated at the rotary speed approximately in the middle of the low-idle rotation speed and the high-idle rotation speed (middle-rotation speed section C).

After a predetermined time being further elapsed, the rotation speed of the crankshaft is further raised from the middle-rotation speed to be rotated at a predetermined high rotation speed, so-called high-idle rotation speed at the high-idle rotation speed section D.

When the rotation speed at the high-idle rotation speed section D is stabilized, load is applied so that the diesel engine 1 works as a motor.

There is no load applied during the time period from the cranking section A to the high-idle rotation speed section D, and the load condition of the diesel engine 1 is low (including no-load).

The processor 142B of the solenoid valve controller 142 controls the solenoid valve 141 so that the butterfly valve 11 is closed from the start of the engine until reaching around the high-idle rotation speed and while the load condition of the diesel engine 1 is low (including no-load), i.e. from the cranking section A to the high-idle rotation speed section D in the diesel engine 1 of the present embodiment, and controls the solenoid valve 141 so that the butterfly valve 11 is opened while operating the diesel engine 1 in the other operation mode of the diesel engine 1.

The processor 142B determines whether the diesel engine 1 is started or not in accordance with the signal inputted by the starting switch through the input portion 142A.

The processor 142B also determines whether the load condition of the diesel engine 1 is low (including no-load) or not based on the fuel injection quantity signal inputted by the engine controller 60 through the input portion 142A.

Specifically, the processor 142B determines the load condition of the diesel engine 1 based on judgment whether fuel injection quantity F has reached a predetermined fuel injection quantity F0 set in advance and stored in the storage 142C, where the processor 142B judges that load greater the than the low load is applied to the diesel engine 1 when the fuel injection quantity F has reached the predetermined fuel injection quantity F0.

On the other hand, when the fuel injection quantity F has not reached the predetermined fuel injection quantity F0, the processor 142B judges that the load condition of the diesel engine 1 is low (including no-load).

When the processor 142B judges that the operation of the diesel engine 1 is at the section from the cranking section A to the high-idle rotation speed section D, i.e., at the first predetermined period, based on the signal from the starting switch and the engine controller 60, the processor 142B outputs a predetermined signal to the solenoid valve 141 to switch the position of the solenoid valve 141 to the position (B). Accordingly, the projection of the rod 121 from the hydraulic cylinder 12 becomes great to close the butterfly valve 11.

On the other hand, when the processor 142B judges that the operating condition of the diesel engine 1 is not at the section from the cranking section A to the high-idle rotation speed section D, the processor 142B outputs a predetermined signal to the solenoid valve 141 to switch the position of the solenoid valve 141 to the position (A). Accordingly, the projection of the rod 121 from the hydraulic cylinder 12 becomes small to open the butterfly valve 11.

Figure 4:
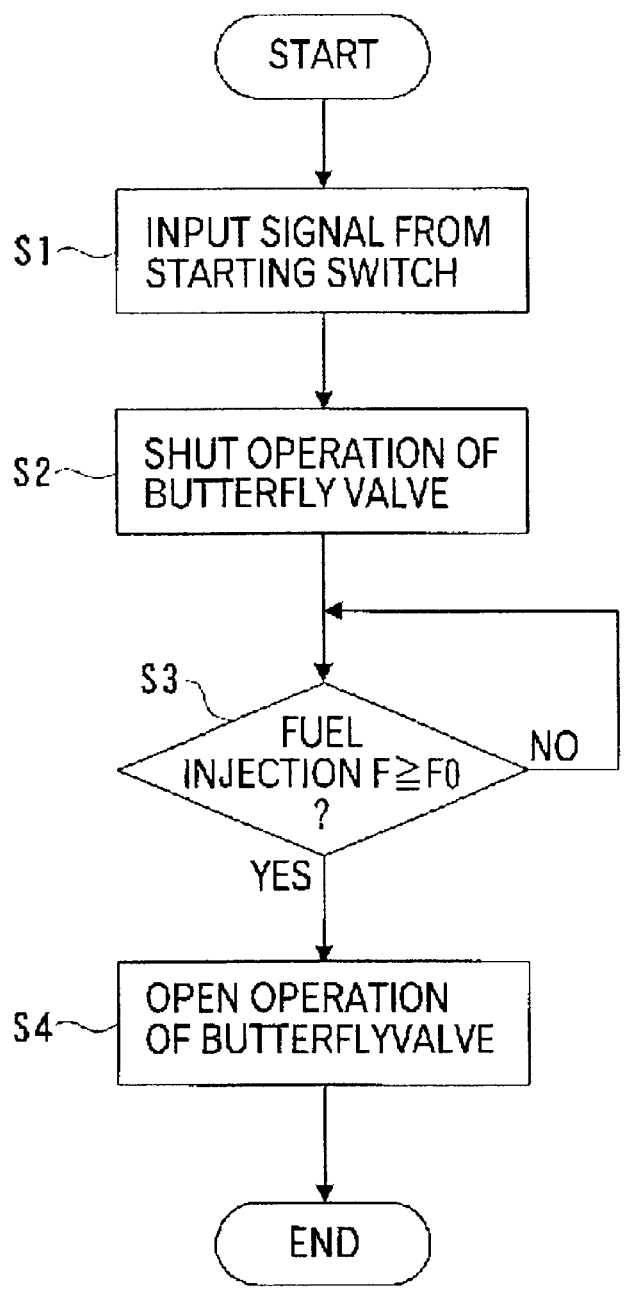
FIG. 4 is a flowchart showing an operation of the first embodiment.

Next, an operation of the present embodiment will be described below with reference to the flowchart shown in FIG. 4.

When the starting switch is turned on, the rotation of the crankshaft is started by a drive source such as a motor of starting device, so that the diesel engine 1 is started.

In step S1, when the starting switch is turned on, the ON-signal from the starting switch is inputted to the solenoid valve controller 142 to actuate the solenoid valve controller 142, advancing to step S2.

Once the solenoid valve controller 142 is actuated, the controller 142 receives the fuel injection quantity signal indicating the fuel injection quantity F supplied from the engine controller 60 into the cylinder.

In the step S2, the solenoid valve controller 142 closes the butterfly valve 11 to throttle the exhaust flow when the ON-signal from the starting switch is inputted, advancing to the step S3.

Accordingly, a part of the exhaust is retained in the cylinder and the intake air amount inhaled in the cylinder is reduced, so that the heat quantity given into the inside of the cylinder by the high-temperature exhaust is increased and the heat quantity being taken away from the inside of the cylinder by the low-temperature intake-air is reduced, so that the temperature inside the cylinder is rapidly increased, thereby accelerating ignition and complete combustion of the fuel.

In the step S3, whether the fuel injection quantity F has reached the predetermined fuel injection quantity F0 is checked and, when the fuel injection quantity F has reached the predetermined fuel injection quantity F0, i.e., when the load applied to the diesel engine 1 is greater than low-load, the process advances to step S4.

On the other hand, when the fuel injection quantity F has not reached the predetermined fuel injection quantity F0, since the load condition of the diesel engine 1 is low (including no-load), the solenoid valve controller 142 again receives the fuel injection quantity signal from the engine controller 60 and checks whether the fuel injection quantity F has reached the predetermined fuel injection quantity F0 or not.

In the step S4, since the fuel injection quantity F has reached the predetermined fuel injection quantity F0 and a load greater than the low-load is applied to the diesel engine 1, the butterfly valve 11 is opened to release throttle of the exhaust flow. This is because, when the load is applied after the diesel engine 1 passes through the cranking section A to the high-idle rotation speed section D, since the fuel injection into the cylinder of the engine body 20 is increased so that the in-cylinder temperature, i.e., the engine temperature, is sufficiently raised, it is not necessary to throttle the exhaust flow for ignition and complete combustion of the fuel.

Thereafter, the solenoid valve controller 142 is stopped until the diesel engine 1 is stopped and re-actuated, and the position of the solenoid valve 141 remains at the position (A).

Incidentally, though the signal is outputted when the starting switch is turned on and the butterfly valve 11 is closed when the signal is inputted to the solenoid valve controller 142, the signal may be outputted to the solenoid valve controller 142 when the starting switch is turned off and the butterfly value 11 may be closed when the signal is inputted to the solenoid valve controller 142, thereby throttling the exhaust flow in starting the diesel engine 1.

According to the above-described embodiment, following advantages can be obtained.

In the present embodiment, since the diesel engine is controlled so that the exhaust flow is throttled by closing the butterfly valve 11 from the cranking section A to the high-idle rotation speed section D (the first predetermined period), much exhaust can be retained in the cylinder of the engine body 20 and the intake-air supplied to the inside of the cylinder can be reduced.

Accordingly, from the cranking section A to the high-idle rotation speed section D, even when the load condition of the diesel engine 1 is no-load or low-load and small amount of fuel is supplied in the cylinder, small heat quantity is deprived of by the low-temperature intake-air and the heat quantity to the inside of the cylinder by the high-temperature exhaust can be increased, the in-cylinder temperature can be rapidly raised and the ignition and complete combustion of the fuel can be enhanced.

Further, since the exhaust flow is throttled until the operation of the diesel engine 1 reaches the high-idle rotation speed section D, the in-cylinder temperature can be easily raised even when the combustion time is gradually shortened in accordance with acceleration of the engine speed. Accordingly, ignition and complete combustion of the fuel can be enhanced even when the operation of the diesel engine 1 is at the high-idle rotation speed section D.

Further, since the diesel engine 1 is controlled so that the exhaust flow is throttled from the cranking section A, the intake-air into the cylinder in starting the engine can be reduced and much exhaust can be retained in the cylinder. Accordingly, small amount of heat quantity is deprived of by the low-temperature intake-air in starting the diesel engine 1 and much heat quantity can be given in the cylinder by the exhaust, ignition and complete combustion of the fuel can be enhanced and startability can be improved.

In the diesel engine 1 using the emulsion fuel where engine hunching and white smoke discharge are more likely than an ordinary diesel engine using light oil etc., the exhaust flow is throttled by closing the butterfly valve 11 from the cranking section A to the high-idle rotation speed section D, the likelihood of engine hunching and discharge amount of the white smoke can be greatly and effectively reduced.

Since emulsion fuel is used in the diesel engine 1, NOx in the exhaust gas can be reduced.

Since the exhaust flow of the diesel engine 1 is throttled by the flow adjuster 10, the exhaust is more easily retained in the cylinder and more exhaust can be retained in the cylinder, so that the heat quantity of the exhaust more rapidly raises the in-cylinder temperature.

[Second Embodiment]

Figure 5:
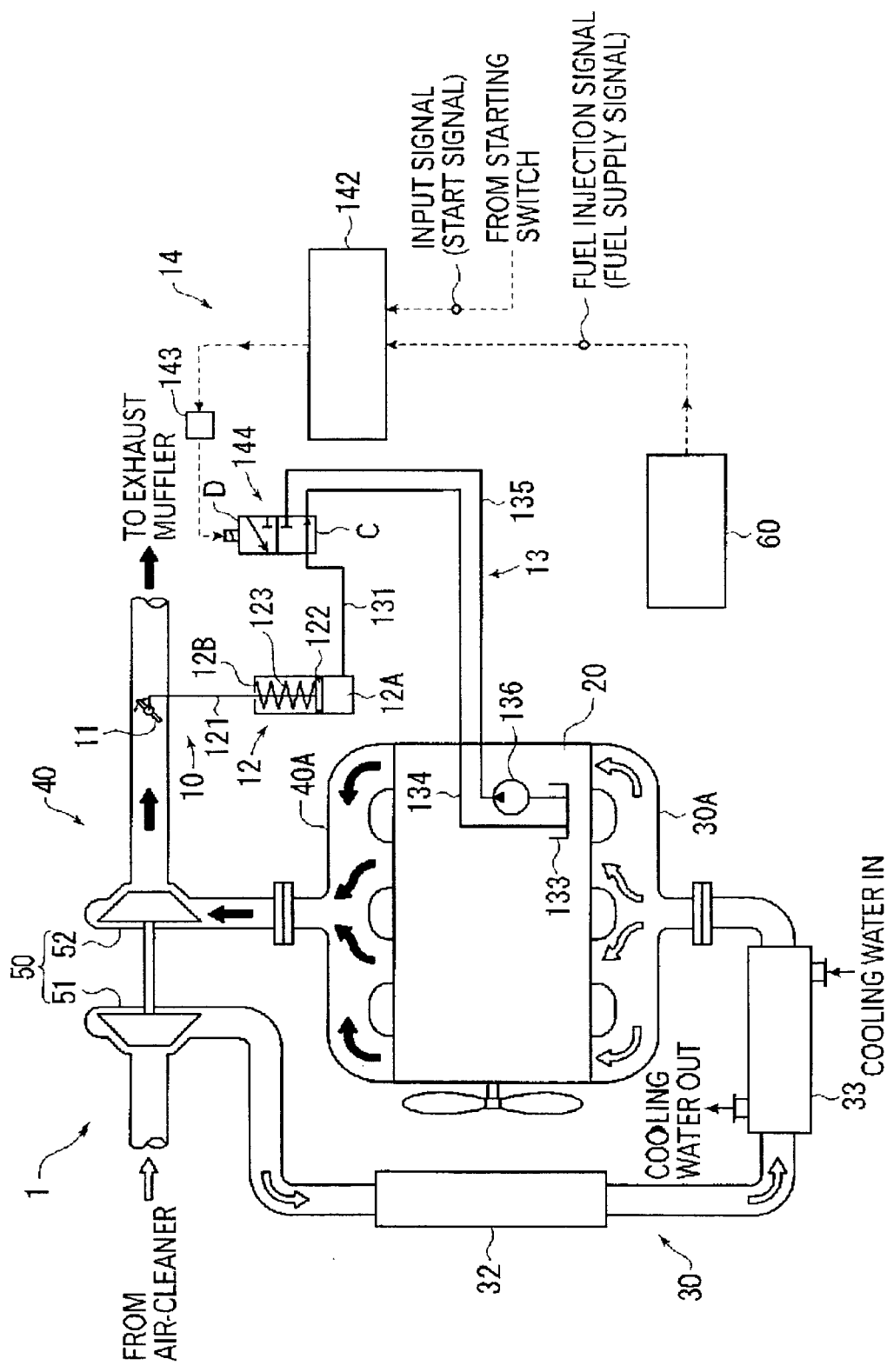
FIG. 5 is a schematic diagram showing a diesel engine according to second embodiment of the present invention.

FIG. 5 shows a second embodiment of the present invention. Though the hydraulic oil is supplied to the bottom 12A side or the head 12B side of the hydraulic cylinder 12 for opening and shutting the butterfly valve 11 to change the projection of the rod 121 from the hydraulic cylinder 12 in the first embodiment, the projection of the rod 121 from the hydraulic cylinder 12 is changed by supplying and discharging hydraulic oil to the bottom 12A of the hydraulic cylinder 12 in the present embodiment.

In the FIG. 5, a compression spring 123 as a biasing means for forcing the piston 122 to the bottom 12A side is provided on the head 12B side of the inside of the hydraulic cylinder 12. Unlike the above-described first embodiment, only the bottom channel 131 is connected to the hydraulic cylinder 12.

A solenoid valve 144 is disposed between the bottom channel 131, and the drain channel 134 and the supply channel 135, the position of the solenoid valve 144 being switched to select supply and discharge of the hydraulic oil to the bottom 12A side of the hydraulic cylinder 12.

The solenoid valve 144 has two positions of position (C) and position (D).

When the solenoid valve 144 is at the position (C), the bottom channel 131 and the drain channel 134 are connected, and the piston 122 is biased to the bottom 12A side by the compression spring 123 to discharge the hydraulic oil from the bottom 12A side of the hydraulic cylinder 12. Accordingly, the projection of the rod 121 from the hydraulic cylinder 12 is reduced.

On the other hand, when the solenoid valve is at the position (D), the bottom channel 131 and the supply channel 135 are connected to supply the hydraulic oil to the bottom 12A. Accordingly, the piston 122 is allowed to move to the side of the head 12B to increase the projection of the rod 121 from the hydraulic cylinder 12.

In the present embodiment, in addition to the same functions and advantages as the first embodiment, since only the bottom channel 131 is connected to the hydraulic cylinder 12, the structure can be simplified.

[Third Embodiment]

Figure 6:
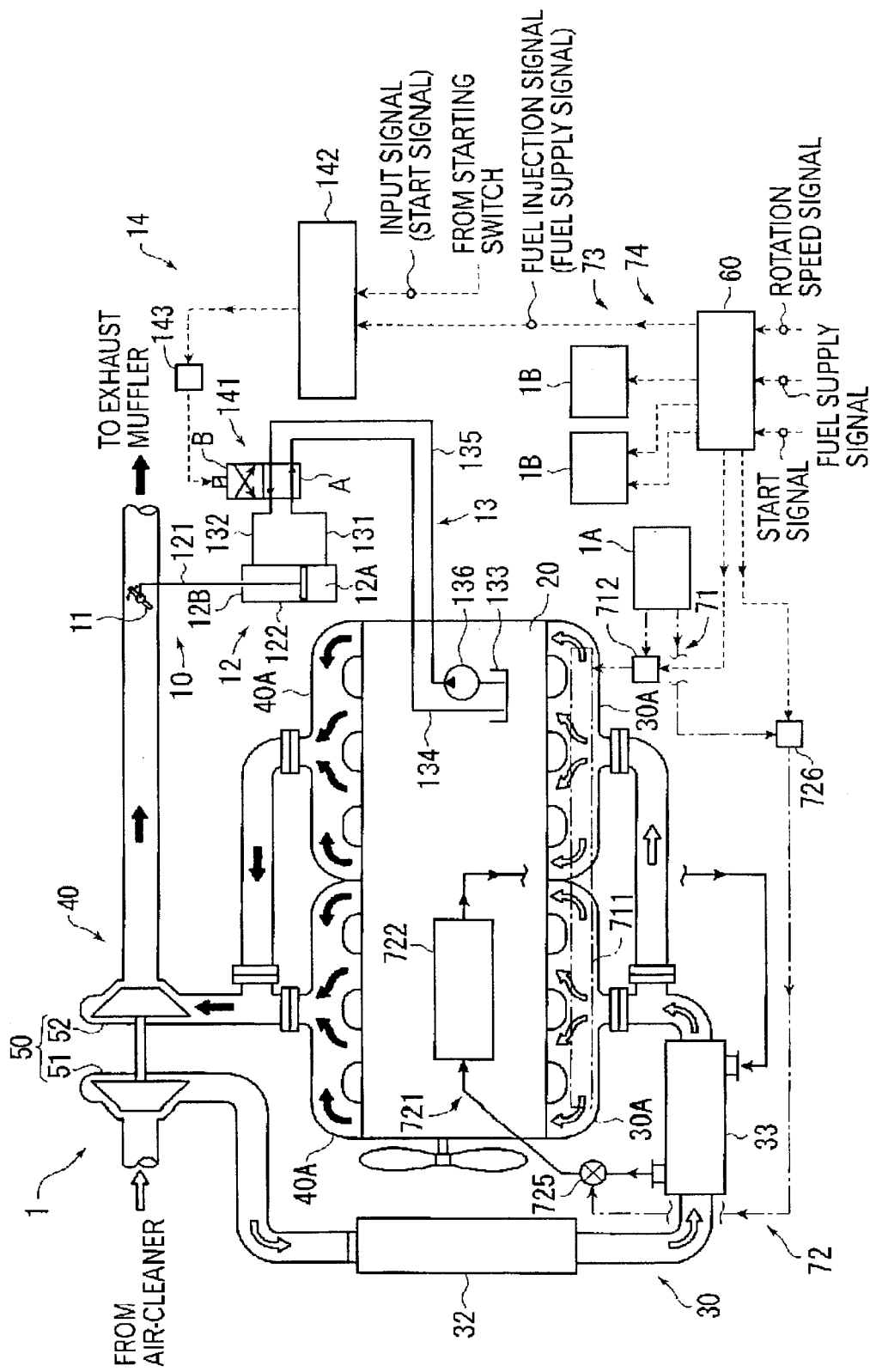
FIG. 6 is a schematic diagram showing a diesel engine according to third embodiment of the present invention.

FIG. 6 shows a third embodiment of the present invention. In the third embodiment, though the ignition and complete combustion of the fuel is enhanced by the single flow adjuster 10 as the combustion stabilization assist in the above-described first embodiment, the ignition and complete combustion of the fuel is enhanced by the five combustion stabilization assist including the flow adjuster 10.

Specifically, the diesel engine 1 has five combustion stabilization assist of an intake heating device 71 for heating intake air, a thermal medium circulator 72 for warming the diesel engine 1 by circulating thermal medium, a cylinder cut-off device 73 for conducting cylinder cut-off operation and a fuel injection timing advancing device 74, for advancing the timing for supplying fuel to the cylinder as well as the flow adjuster 10 for throttling the flow of the exhaust.

In the third embodiment, though the pair of the intake manifold 30A and the exhaust manifold 40A are used in the diesel engine 1 in the above-described diesel engine 1, a plurality of (two, in the present embodiment) intake manifolds 30A and exhaust manifolds 40A are used.

Specifically, though not shown, the diesel engine 1 has an engine body 20 formed in, for instance, a V-shape having two banks. A plurality of cylinders as combustion chambers are disposed in the respective banks and a pair of the intake manifold 30A and the exhaust manifold 40A are provided in the respective banks, so that the diesel engine 1 uses total two intake manifolds 30A and exhaust manifolds 40A. Incidentally, the two intake manifolds 30A are mutually connected at the upstream thereof and the two exhaust manifolds 40A are mutually connected on the downstream thereof.

Further, though not shown, a fuel injection pump for compressively feeding the fuel to the cylinder is provided to each bank in the present embodiment, the two fuel injection pumps being provided with an electric governor 1B respectively for adjusting fuel injection amount and fuel injection timing of the pump. The two electric governors 1B are electrically connected to the engine controller 60 and the operation thereof is controlled by a control signal outputted by the engine controller 60.

In other words, in the diesel engine 1 of the present embodiment, the intake/exhaust system and fuel system are substantially independent for each bank.

The engine controller 60 controls the operation of the electric governor 1B in accordance with operating condition of the diesel engine 1.

A start signal indicating engine start, a rotation speed signal indicating engine speed and a fuel supply signal (also called as fuel injection quantity signal) indicating fuel supply to the cylinder are inputted to the engine controller 60. Incidentally, though not shown, a starting switch, an engine speed sensor for detecting engine speed and a fuel supply sensor for detecting fuel supply amount to the cylinder by detecting rack position of fuel injection pump etc. are electrically connected to the engine controller 60 in order to obtain the input signals.

Figure 7:
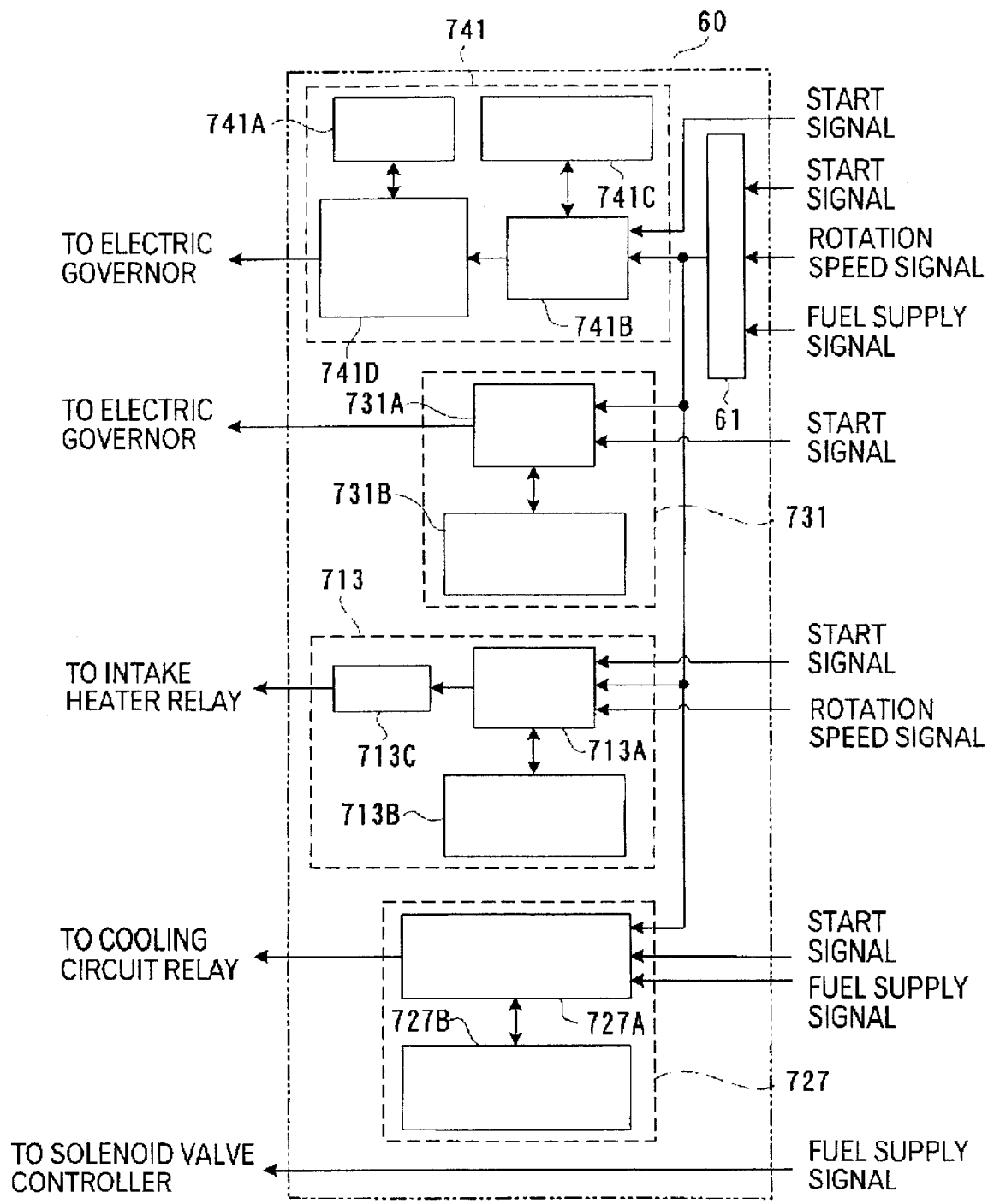
FIG. 7 is a block diagram showing an engine controller according to the third embodiment.

As shown in FIG. 7, the engine controller 60 has an intake heating control section 713 constituting the intake heating device 71, a thermal medium circulation controller 727 as flow-path open/shut controller constituting the thermal medium circulator 72, a cylinder cut-off control section 731 constituting the cylinder cut-off device 73 and a fuel injection timing advancing controller 741 constituting the fuel injection timing advancing device 74, the controllers 731, 727, 731 and 741 being operated based on operation mode indicating operating condition of the diesel engine 1 as well as the start signal, the rotation speed signal and the fuel supply signal inputted to the engine controller 60. The operation mode of the diesel engine 1 is determined by an operation mode setting means 61 provided in the engine controller 60.

Incidentally, details of the respective controllers 73, 727, 731 and 741 will be described below in describing the respective devices 71, 72, 73 and 74.

The operation mode setting means 61 determines according to which one of the operation modes among preset plurality of operation modes the diesel engine 1 is operated based on various information such as start signal, rotation speed signal and fuel supply signal etc. inputted to the engine controller 60.

Figure 8:
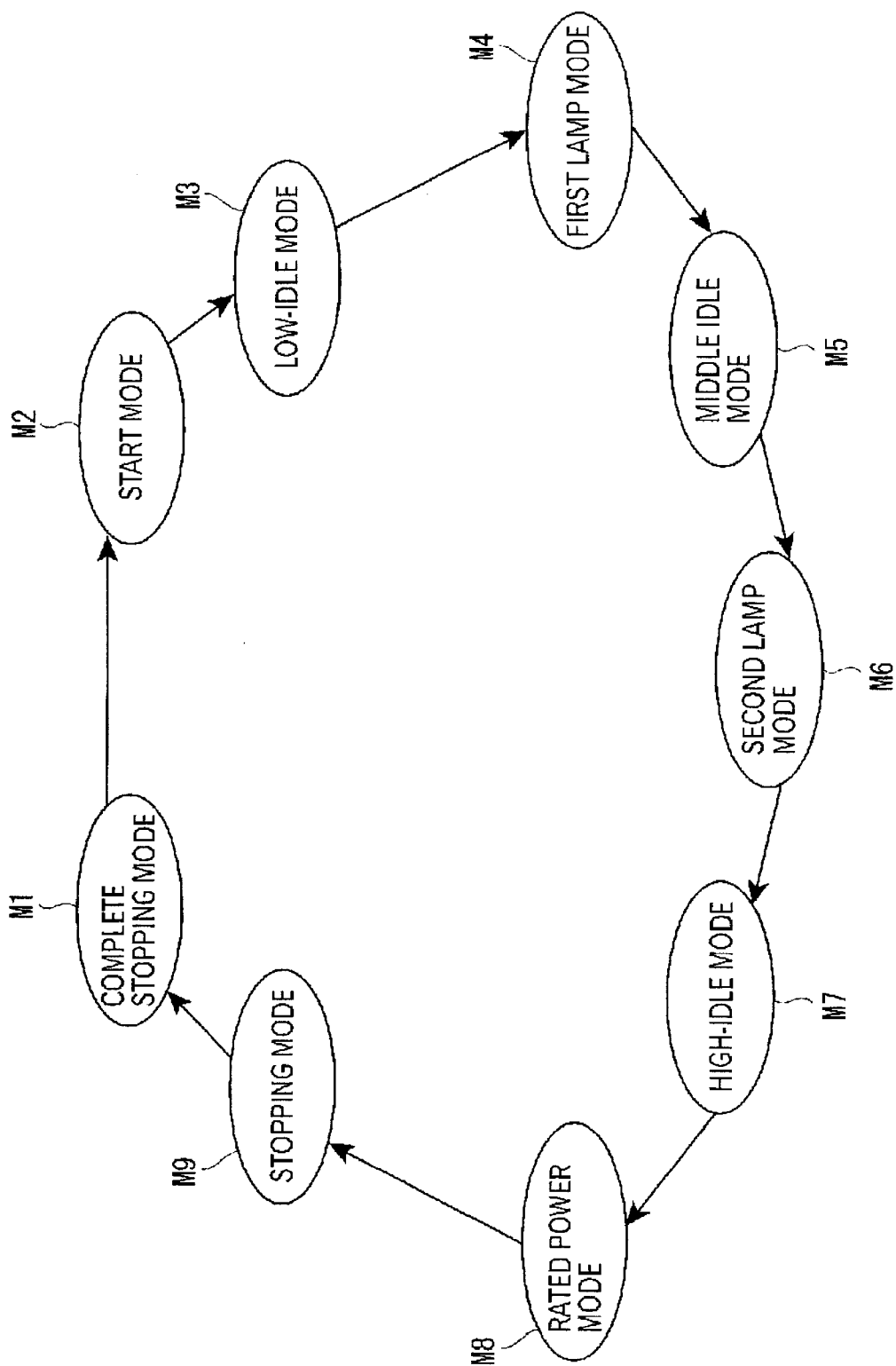
FIG. 8 is an illustration of respective operation modes of the diesel engine according to the third embodiment.

As shown in FIG. 8, the plurality of operation modes includes: a complete stop mode M1 indicating zero engine speed and complete suspension of the operation of the diesel engine 1; a starting mode M2 indicating so-called cranking condition where the starting switch is turned on and the crankshaft is rotated by a motor of a starter (not shown) of the diesel engine 1; a low-idle mode M3 indicating that the cranking is terminated and the crankshaft is rotated at a predetermined low rotation speed (low-idle rotation speed) by ignition and explosion of the fuel in the cylinder; a middle-idle mode M5 indicating that the crankshaft is rotated at a predetermined intermediate rotation speed (middle idle rotation speed) by the ignition and explosion of the fuel; a first lamp mode M4 indicating that the rotation speed is gradually raised from the low-idle mode and being transferred to the middle-idle mode M5; a high-idle mode M7 indicating that the crankshaft is rotated at a predetermined high rotation speed (high idle rotation speed) by ignition and explosion of the fuel; a second lamp mode M6 indicating that the rotation speed is gradually raised from the middle-idle mode M5 and being transferred to the high-idle mode M7; a rated power mode M8 indicating that more than predetermined load is applied to the diesel engine 1 (i.e. more than predetermined amount of fuel is supplied to the inside of the cylinder) and the diesel engine 1 works as a motor; and a stopping mode M9 indicating that the rotation speed of the diesel engine 1 is gradually lowered to be transferred to the complete stop mode M1.

Since the operation mode setting means 61 sequentially selects the complete stop mode M1, the starting mode M2, the low-idle mode M3, the first lamp mode M4, the middle-idle mode M5, the second lamp mode M6 and the high-idle mode M7 based on the respective information such as the start signal, the rotation speed signal and the fuel supply signal inputted to the engine controller 60, the diesel engine 1 conducts operation in accordance with the respective modes to raise the engine rotation speed to the high idle rotation speed.

Next, four combustion stabilization assist other than the flow adjuster 10 described in the above-described first embodiment will be described below in detail.

(Arrangement of Intake Heating Device)

As shown in FIG. 6, the intake heating device 71 heats the intake air supplied into the cylinder of the diesel engine 1 to warm the inside of the cylinder to enhance ignition and complete combustion of the fuel. The intake heating device 71 has an intake heater 711 provided to the intake manifold 30A as an intake heating means, the intake heater 11 having heating wire (not shown) attached to the inner wall of the intake manifold 30A. The intake heater 711 is electrically connected to a battery 1A of the diesel engine 1 through an intake heater relay 712. When the intake heater relay 712 is turned on, the intake heater 711 and the battery 1A are electrically conducted so that heat is generated by the heating wire to heat the intake air. On the other hand, when the intake heater relay 712 is turned off, the intake heater 711 and the battery 1A are electrically shut off so that no heat is generated by the heating wire and the intake air is not heated.

The intake heater relay 712 is electrically connected to the engine controller 60. The ON/OFF control of the intake heater relay 712 is conducted by the intake heating control section 713 of the engine controller 60 based on the operating condition of the diesel engine 1.

As shown in FIG. 7, the intake heating control section 713 includes an intake heating controller 713A for determining ON and OFF of the intake heater relay 712, an intake heating timing storage 713B storing the most appropriate timing for heating the intake air by the intake heater 711 so that the ignition and complete combustion of the fuel inside the cylinder can be efficiently enhanced, and a timer 713C for turning the intake heater relay 712 off when a predetermined time elapsed after the intake heater relay 712 is turned on.

The diesel engine 1 is controlled so that the intake air is heated when less amount of fuel is supplied in the cylinder and the temperature in the cylinder is low and the intake air is heated when much fuel is supplied to the cylinder and the in-cylinder temperature is high.

In order to generate heat by the intake heater 711 when the fuel supply to the cylinder is low and the in-cylinder temperature is low, the intake heating controller 713A outputs a control signal for turning on the intake heater relay 712 and outputs a control signal to the intake heater relay 712 for turning off the intake heater relay 712 when much fuel is supplied to the cylinder and the in-cylinder temperature is high for stopping heat generation by the intake heater 711. The timer 713C starts counting time when the intake heater relay 712 is turned on and outputs a control signal to the intake heater relay 712 After a predetermined time is elapsed for turning off the intake heater relay 712 to stop heat generation by the intake heater 711.

(Arrangement of Thermal Medium Circulator)

As shown in FIG. 6, the thermal medium circulator 72 has a water-cooling circuit 721 as a temperature adjusting means for adjusting the temperature of the diesel engine 1 by circulating cooling water as thermal medium. The cooling circuit 721 has the above-described water-cooled charged air cooler 33, a water pump for compressively feeding the cooling water (not shown), a water jacket provided to the engine body 20 (not shown) etc.

A thermal medium heater 722 for heating cooling water is provided at the halfway of the cooling circuit 721 and the thermal medium heater 722 has heating wire attached to the inner wall etc. of the flow-path of the thermal medium. The thermal medium heater 722 is connected to a power source independent of, for instance, the diesel engine 1. Though not shown, ON/OFF control of the thermal medium heater 722 is conducted based on a cooling water temperature signal outputted by a temperature sensor for detecting the temperature of the cooling water of the cooling circuit 721. Such thermal medium heater 722 heats the cooling water when the temperature of the cooling water becomes below a predetermined temperature (normal temperature (around 20 degrees), for instance) to keep the temperature of the cooling water above the predetermined temperature. Since the thermal medium heater 722 is provided, the temperature of the cooling water can be maintained at more than a predetermined temperature even in cold time and cold area, so that the engine 1 can be instantly started when the diesel engine 1 is used as a motor for emergency power generator etc.

A cooling circuit valve 725 as a flow-path open/shut means for opening and shutting the cooling water channel is provided at the halfway of the cooling circuit 721. The cooling circuit valve 725 is electrically connected to a battery 1A of the diesel engine 1 through a cooling circuit relay 726.

In thus arranged thermal medium circulator 72, when the cooling circuit relay 726 is turned on, the cooling circuit valve 725 and the battery 1A are electrically connected to open the cooing circuit valve 725, so that warm cooling water is circulated in the cooling circuit 721 to warm the diesel engine 1. On the other hand, when the cooling circuit relay 726 is turned off, the cooling circuit valve 726 is electrically isolated from the battery 1A to close the cooling circuit valve 725, so that warm cooling water is not circulated in the cooling circuit 721 and the diesel engine 1 is not warmed.

The cooling circuit relay 726 is electrically connected to the engine controller 60. The ON/OFF operation of the intake heater relay 712 is controlled by a thermal medium circulation controller 727 of the engine controller 60 based on the operating condition of the diesel engine 1.

As shown in FIG. 7, the thermal medium circulation controller 72 has a cooling circuit valve open/shut controller 727A for determining ON/OFF operation of the cooling circuit relay 726, and the intake heating timing storage 713B storing the most appropriate timing for circulating the cooling water heated by the thermal medium heater 722 so that ignition and complete combustion of the fuel in the cylinder can be efficiently enhanced.

The diesel engine 1 is controlled so that warm cooling water is circulated when the fuel supply to the cylinder is small and the in-cylinder temperature is low and the warm cooling water is not circulated when much fuel is supplied to the cylinder and the in-cylinder temperature is high.

In the diesel engine 1, in order to open the cooling circuit valve 725 when small amount of fuel is supplied to the cylinder and the in-cylinder temperature is low, a control signal for turning on the cooling circuit relay 726 is outputted to the cooling circuit relay 726. The cooling circuit valve open/shut controller 727A outputs a control signal for turning off the cooling circuit relay 726 when much fuel is supplied into the cylinder and the in-cylinder temperature is high in order to shut the cooling circuit valve 725.

(Fuel injection timing advancing device)

As shown in FIGS. 6 and 7, the fuel injection timing advancing device 74 enhances stabilization of fuel combustion by lengthening the combustion time of the fuel by advancing the fuel supply timing to the cylinder, which includes the electric governor 1B provided to the respective fuel injection pump and the fuel supply timing advance timing controller 741 of the engine controller 60.

The fuel supply timing advance timing controller 741 includes a map storage 741A storing two maps indicating the most appropriate fuel supply timing in accordance with engine rotation speed and engine load (fuel supply to the cylinder), a map switcher 741B for deciding the map to be used in accordance with the operating condition of the diesel engine 1 out of the two maps, a map switching timing storage 741C storing the most appropriate timing for switching the map to be used, and a fuel-injection/injection-timing controller 741D for determining the fuel supply and supply timing to the cylinder in accordance with the map selected by the map switcher 741B.

In the two maps of the map storage 741A, the first map indicates advance timing control when the engine speed is low and retard timing control when the engine speed is high. The second map conducts advance timing control irrespective of the engine speed.

In the diesel engine 1, when small amount of fuel is supplied to the cylinder and the in-cylinder temperature is low, the fuel supply timing to the cylinder is advanced to lengthen the fuel combustion time and, when much fuel is supplied to the cylinder and the in-cylinder temperature is high, the fuel supply timing is retarded to shorten the fuel combustion time.

The map switcher 741B of the engine controller 60 outputs a signal for selecting the second map to the fuel-injection/injection-timing controller 741D in order to advance the fuel supply timing to the cylinder when small amount of fuel is supplied to the cylinder and the in-cylinder temperature is low. The map switcher 741B outputs a signal for selecting the first map to the fuel-injection/injection-timing controller 741D in order to retard the fuel supply timing to the cylinder when much fuel is supplied to the cylinder and the in-cylinder temperature is high.

(Cylinder Cut-Off Device)

As shown in FIG. 6, the cylinder cut-off device 73 conducts so-called cylinder cut-off operation for suspending the fuel supply to a part of the cylinder of the plurality of cylinders of the diesel engine 1, which includes the electric governor 1B provided to the respective fuel injection pumps and the cylinder cut-off control section 731 of the engine controller 60.

As shown in FIG. 7, the cylinder cut-off control section 731 includes a cylinder cut-off controller 731A for deciding whether the fuel is injected or not from one of the two fuel injection pumps, and a cylinder cut-off timing storage 731B storing the most appropriate timing for conducting cylinder cut-off operation in order to efficiently enhance the ignition and complete combustion of the fuel in the cylinder.

The diesel engine 1 is controlled so that cylinder cut-off operation is conducted when small amount of fuel is supplied to the cylinder and the in-cylinder temperature is low and cylinder cut-off operation is not conducted when much fuel is supplied to the cylinder and the in-cylinder temperature is high.

In the diesel engine 1, the cylinder cut-off controller 731A of the engine controller 60 outputs a control signal for establishing non-injection status of the fuel injection pump to one of the electric governors 1B so that the fuel is not compressively fed (injected) from one of the two fuel injection pumps in order to conduct the cylinder cut-off operation when small amount of fuel is injected to the cylinder and the in-cylinder temperature is low. In other words, the fuel is supplied to only one of the cylinders provided to one of the banks of the engine body 20 in the diesel engine 1, thereby conducting the cylinder cut-off operation (so-called one-side bank operation). Incidentally, in the diesel engine 1 of the present embodiment, since the intake/exhaust system and the fuel system are substantially independent for each bank as described above, stable operation of the diesel engine 1 is possible even when the cylinder cut-off operation is conducted.

When such cylinder cut-off operation is conducted, since the fuel is not supplied to a part of the cylinders and explosive force from the cylinder is not obtained, the load applied to the rest of the cylinders is increased. In the diesel engine 1, a map indicating engine speed and the most appropriate fuel supply in accordance with the engine load is stored in the map storage 741A of the engine controller 60 and the fuel-injection/injection-timing controller determines the fuel supply to the cylinder based on the map. The fuel-injection/injection-timing controller 741D controls the electric governor 1B so that the fuel supply is increased when the load applied to the engine is great and the fuel supply is reduced when small load is applied to the engine. Accordingly, when the load applied to the rest of the cylinder is increased, the fuel supply per one remaining cylinders is increased, thereby rapidly raising the temperature of the engine body 20 and enhancing the ignition and complete combustion of the fuel.

Further, the cylinder cut-off controller 731A outputs a control signal to establish injection status of the two fuel injection pumps so that the fuel is compressively fed from the two fuel injection pumps when much fuel is supplied to the cylinder and the in-cylinder temperature is high.

Next, a function of the present embodiment will be described below with reference to the time chart of FIG. 9 and the flowchart of FIGS. 10 to 14.

Initially, the flow of the operating condition of the diesel engine 1 in the present embodiment will be described below with reference to FIG. 9.

(Start Mode)

When the starting switch is turned on during the complete stop mode M1 where the engine speed is zero, the diesel engine 1 is transferred to the starting mode M2 to start rotation of the crankshaft by a starter (not shown). After a predetermined time is elapsed, the rotation of the crankshaft by the starter is terminated and the crankshaft is started to be rotated by the ignition and explosion of the fuel in the cylinder (so-called self operation) and the engine speed is gradually raised.

(Low-idle mode)

When the engine speed exceeds a predetermined value, the operation is transferred to the low-idle mode M3 to conduct operation at the low-idle rotation speed.

(First Lamp Mode)

When a predetermined time is elapsed after starting the operation at the low-idle rotation speed, the operation is transferred to the first lamp mode M4, where the engine speed is gradually raised from the low-idle rotation speed.

(Middle-idle mode)

When a predetermined time is elapsed after being transferred to the first lamp mode M4, the operation is transferred to the middle-idle mode M5 and the operation is conducted at an engine speed approximately in the middle of the low-idle rotation speed and the high-idle rotation speed (middle-idle rotation speed).

(Second Lamp Mode)

When a predetermined time is elapsed after starting the operation at the middle-idle rotation speed, the operation is transferred to the second lamp mode M6 and the engine speed is gradually raised from the middle-idle rotation speed.

(High-idle mode)

When a predetermined time is elapsed after being transferred to the second lamp mode M6, the operation is transferred to the high-idle mode M7 and the operation is conducted at the high-idle rotation speed.

(Rated power mode)

When more than predetermined load is applied to the diesel engine 1 after the load is started to be applied during the high-idle mode M7, the operation is transferred to the rated power mode M8 and the diesel engine 1 starts working as a motor.

Thereafter, when the load is released, the operation is sequentially transferred to the low-idle mode M3, the first lamp mode M4, the middle-idle mode M5, the second lamp mode M6, the high-idle mode M7, the stopping mode M9 and the complete stop mode M1 and the operation is terminated.

When the diesel engine 1 conducts the above-described operation, the intake heating device 71, the thermal medium circulator 72, the fuel injection timing advancing device 74 and the cylinder cut-off device 73 are operated as described below based on the operating condition of the diesel engine 1.

Incidentally, since the operation of the flow adjuster 10 is the same as in the above-described first embodiment, description thereof is simplified here. Specifically, as shown in FIG. 9, when the start (ON) signal from the starting switch is inputted, the flow adjuster 10 shuts the butterfly valve 11 to throttle the exhaust flow. Subsequently, when the fuel injection quantity F reaches the predetermined fuel injection quantity F0, i.e. when the load is started to be applied, the butterfly valve 11 is opened to release throttle of the exhaust flow. In other words, the flow adjuster 10 throttles the exhaust flow during the period from the start of the starting mode M2 in starting the engine to the halfway of the high-idle mode M7 (first predetermined period) to enhance combustion stabilization of the fuel in the diesel engine 1.

(Operation of Intake Heating Device)

When the starting switch is turned on, the rotation of the crankshaft is started by a drive source such as the motor of the starter to start the diesel engine 1 and the engine controller 60 and the solenoid valve controller 142 are actuated.

Figure 10:
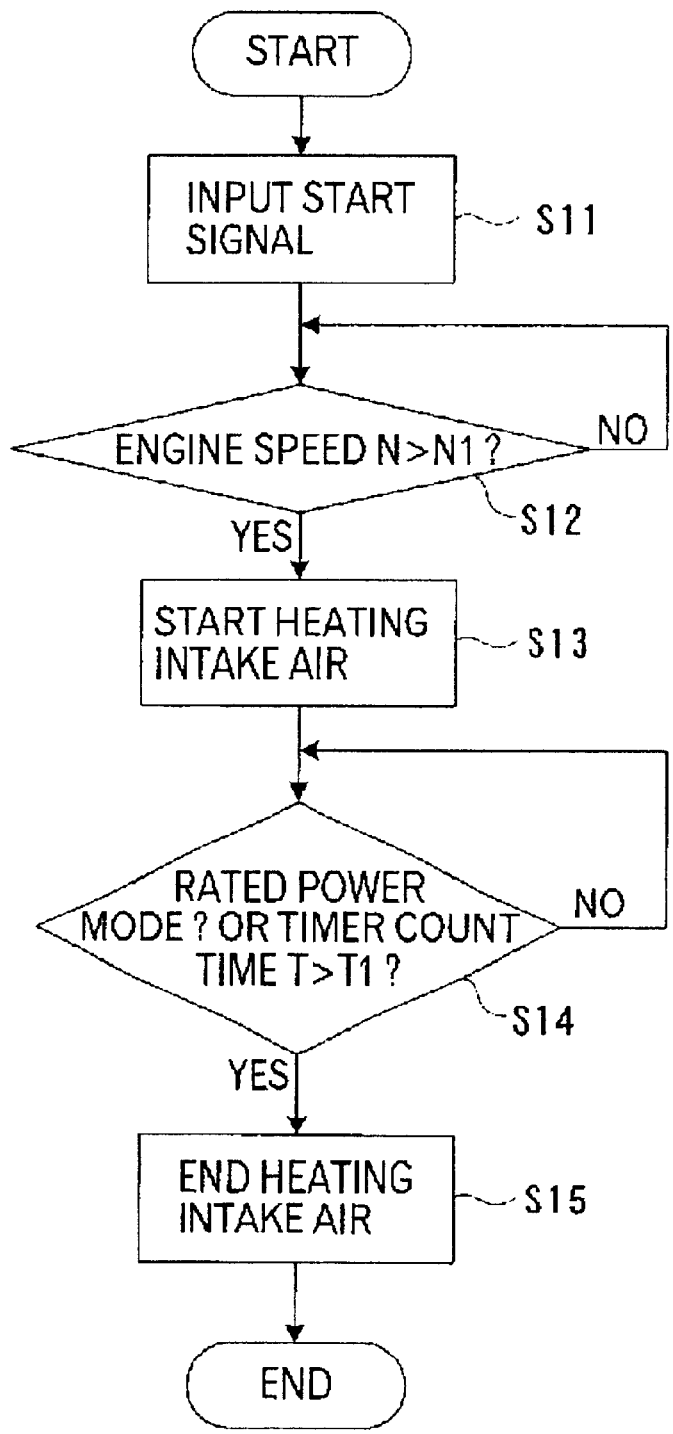
FIG. 10 is a flowchart showing an operation of intake heater according to the third embodiment.

In FIG. 10, when the start signal from the starting switch is inputted to the intake heating controller 713A of the intake heating control section 713 in step S11, the intake heating controller 713A starts receiving the engine speed signal indicating engine speed N from the rotation speed sensor, advancing to step S12.

In the step S12, it is checked whether the engine speed N has reached a predetermined engine speed N1. When the engine speed N has reached the predetermined engine speed N1, i.e. when the rotation of the crankshaft is terminated and the self-operation is started, the operation advances to step S13.

On the other hand, when the engine speed N has not reached the predetermined engine speed N1, since the rotation of the crankshaft by the starter has not been terminated, the intake heating controller 713A again receives the rotation speed signal from the rotation speed sensor in the step S12 and checks whether the engine speed N has reached the predetermined engine speed N1 or not. Accordingly, when the crankshaft is rotated by the starter, the battery 1A of the diesel engine 1 is not used as a power source of the intake heater 711 but is antecedently used as the power source of the starter, the battery 1A can be prevented from going flat.

Figure 9:
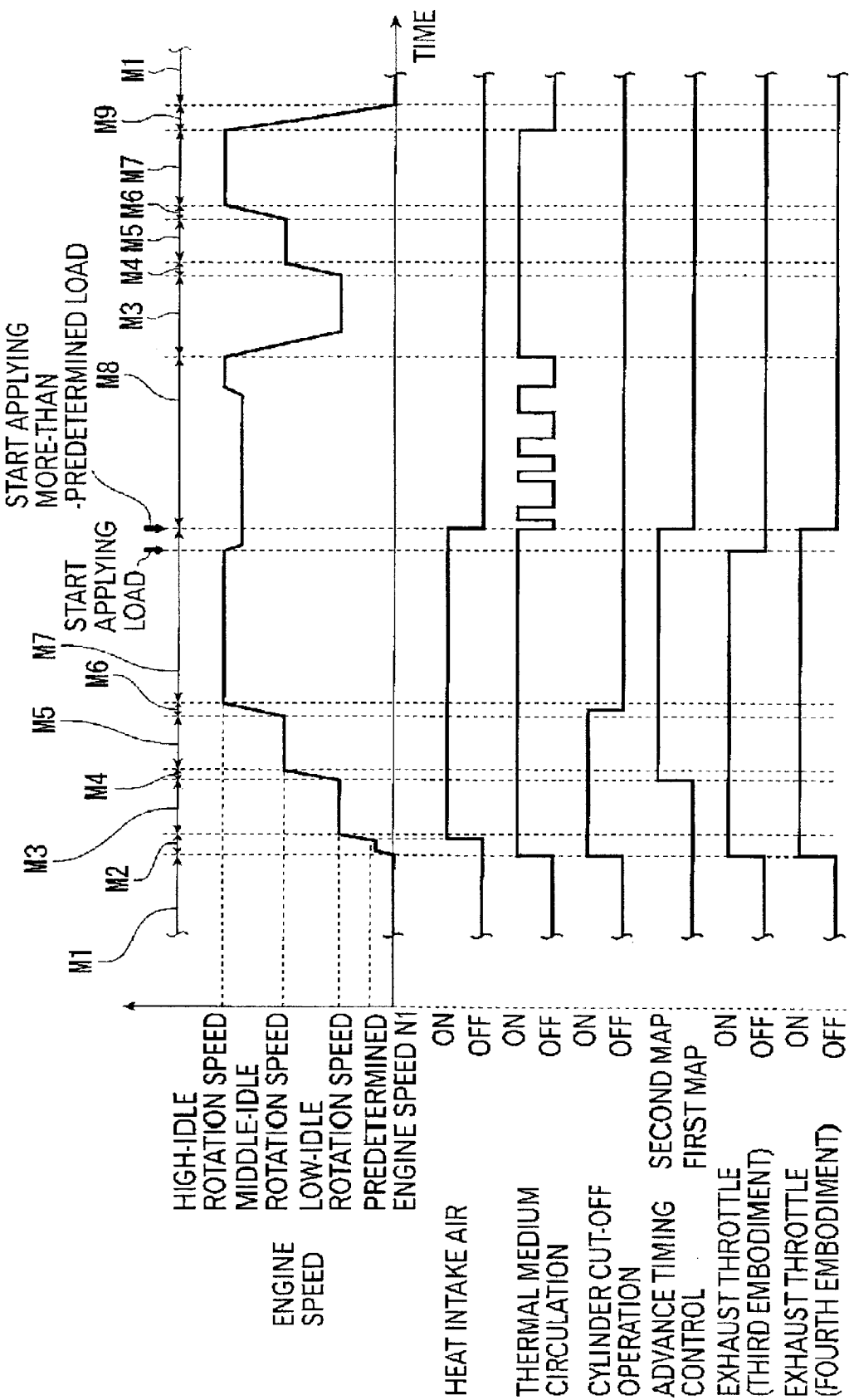
FIG. 9 is a time chart showing an operation of the diesel engine according to the third embodiment.

In the step S13, since the engine speed N has reached the predetermined engine speed N1 and the rotation of the crankshaft by the starter has been terminated, the intake heater relay 712 is turned on and heat is generated by the intake heater 711 to heat the intake air as shown in FIG. 9, advancing to step S14. Here, approximately simultaneously with turning on the intake heater relay 712, time count by the timer 713C is started.

Accordingly, since warm intake air is supplied into the cylinder of the diesel engine 1, the in-cylinder temperature can be rapidly raised and ignition and complete combustion of the fuel can be enhanced.

In the step S14, whether the operation mode of the diesel engine 1 has transferred to the rated power mode M8 or not is checked based on the operation mode signal inputted to the intake heating controller 713A and count time T counted by the timer 713C has reached a predetermined count time T1 or not is checked.

When the operation mode of the diesel engine 1 has transferred to the rated power mode M8 and/or when the count time T has reached the predetermined count time T1, in other words, when more than predetermined load is applied to the diesel engine 1 and the diesel engine 1 is sufficiently warmed by increasing the fuel supplied into the cylinder and/or when heat is generated by the intake heater 711 for substantially long time, the process advances to step S15.

On the other hand, when the operation mode of the diesel engine 1 has not been transferred to the rated power mode M8 and/or when the count time T has not reached the predetermined count time T1, the operation mode signal from the operation mode setting means 61 is received to check whether the operation has been transferred to the rated power mode M8 and the count time T counted by the timer has reached the predetermined count time T1 or not.

In the step S15, when the operation mode of the diesel engine 1 has been transferred to the rated power mode M8, more than predetermined load is applied to the diesel engine 1 and the diesel engine 1 is sufficiently warmed by the increasing amount of the fuel supplied into the cylinder, so that the intake heater relay 712 is turned off to terminate heating the intake air as shown in FIG. 9.

On the other hand, even when the operation mode of the diesel engine 1 has not been transferred to the rated power mode M8, when the count time T has reached the predetermined count time T1, since heat has been generated by the intake heater 711 for substantially long time, the intake heater relay 712 is turned off to terminate heating the intake air in order to prevent burn on the intake heater 711.

Thereafter, the intake heater relay 712 is kept from being turned off until the diesel engine 1 is suspended and restarted.

In other words, as shown in FIG. 9, the intake heating device 71 is actuated during the period from the halfway of the starting mode M2 in starting the engine to the end of the high-idle mode M7 (fifth predetermined period) to heat the intake air.

(Operation of Thermal Medium Circulator)

When the starting switch is turned on, the rotation of the crankshaft is started by the drive source such as the motor of the starter to start the diesel engine 1 and the engine controller 60 and the solenoid valve controller 142 are actuated.

Figure 11:
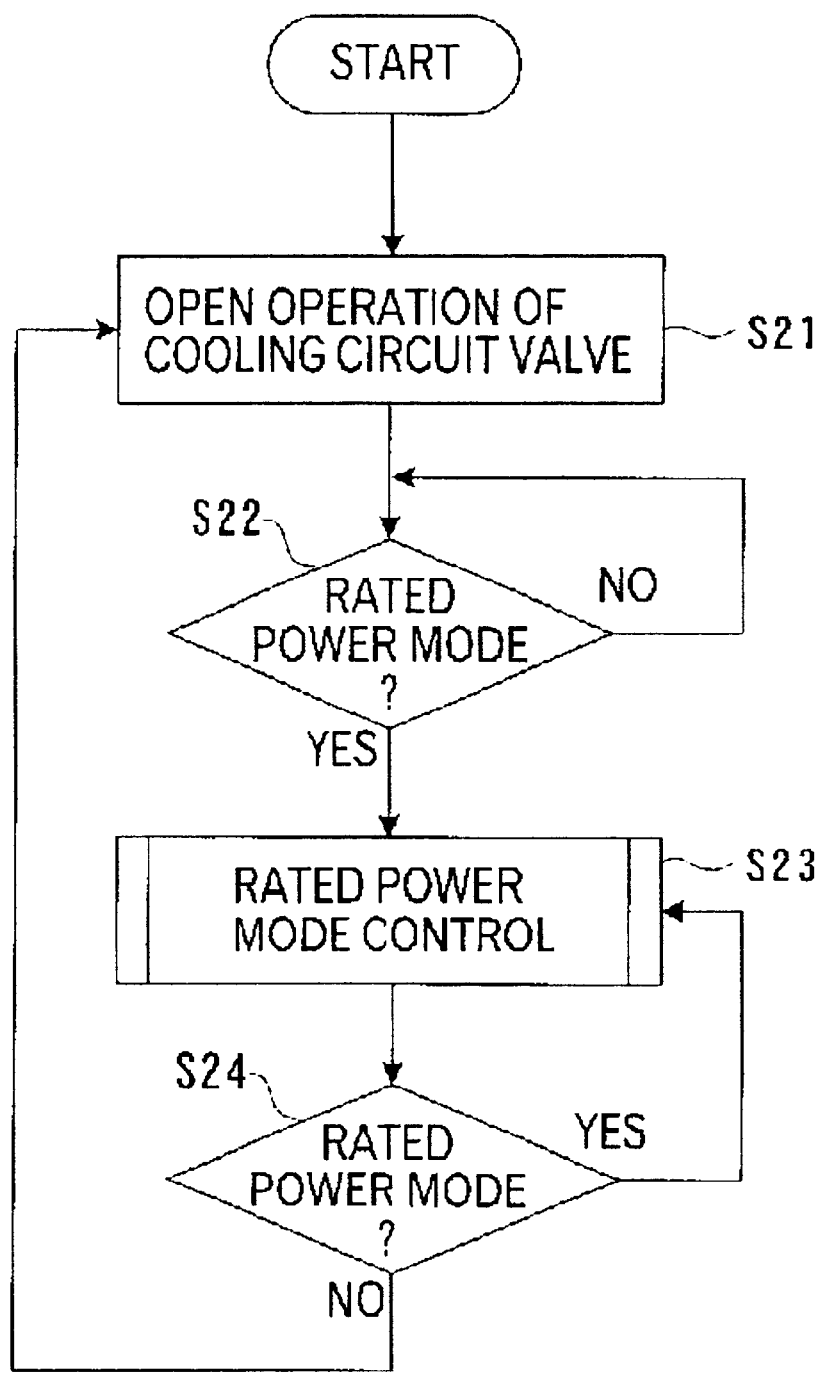
FIG. 11 is a flowchart showing an operation of thermal medium circulator according to the third embodiment.

In FIG. 11, when the start signal from the starting switch is inputted to the cooling circuit valve open/shut controller 727A of the thermal medium circulation controller 727 in step S21, the cooling circuit valve open/shut controller 727A opens the cooling circuit valve 725 to circulate the cooling water as shown in FIG. 9, advancing to step S22.

Accordingly, since the cooling water heated by the thermal medium heater 722 circulates in the cooling circuit 721 to warm the diesel engine 1, the temperature of the cylinder and the intake air etc. is rapidly raised and the ignition and complete combustion of the fuel can be enhanced. Incidentally, the cooling water of the cooling circuit 721 is maintained at a more than predetermined temperature by the thermal medium heater 722.

In the step S22, whether the operation mode of the diesel engine 1 has been transferred to the rated power mode M8 or not is checked based on the operation mode signal inputted to the cooling circuit valve open/shut controller 727A. When the process has been transferred to the rated power mode M8, in other words, when more than predetermined load is applied to the diesel engine 1 and the fuel supplied into the cylinder is increased to a degree, the process advances to step S23. Incidentally, when the operation mode of the diesel engine 1 has been transferred to the rated power mode M8, the cooling water is sufficiently warmed by the temperature of the diesel engine 1, so that the thermal medium heater 722 is stopped.

On the other hand, when the operation mode of the diesel engine 1 has not been transferred to the rated power mode M8, the operation mode signal from the operation mode setting means 61 is again received in the step S22 to check whether the process has been transferred to the rated power mode M8 or not.

In the step S23, since the operation mode of the diesel engine 1 has been transferred to the rated power mode M8, the open/shut operation of the cooling circuit valve 725 is controlled based on the amount of fuel supplied into the cylinder of the diesel engine 1 (rated power mode control).

Figure 12:
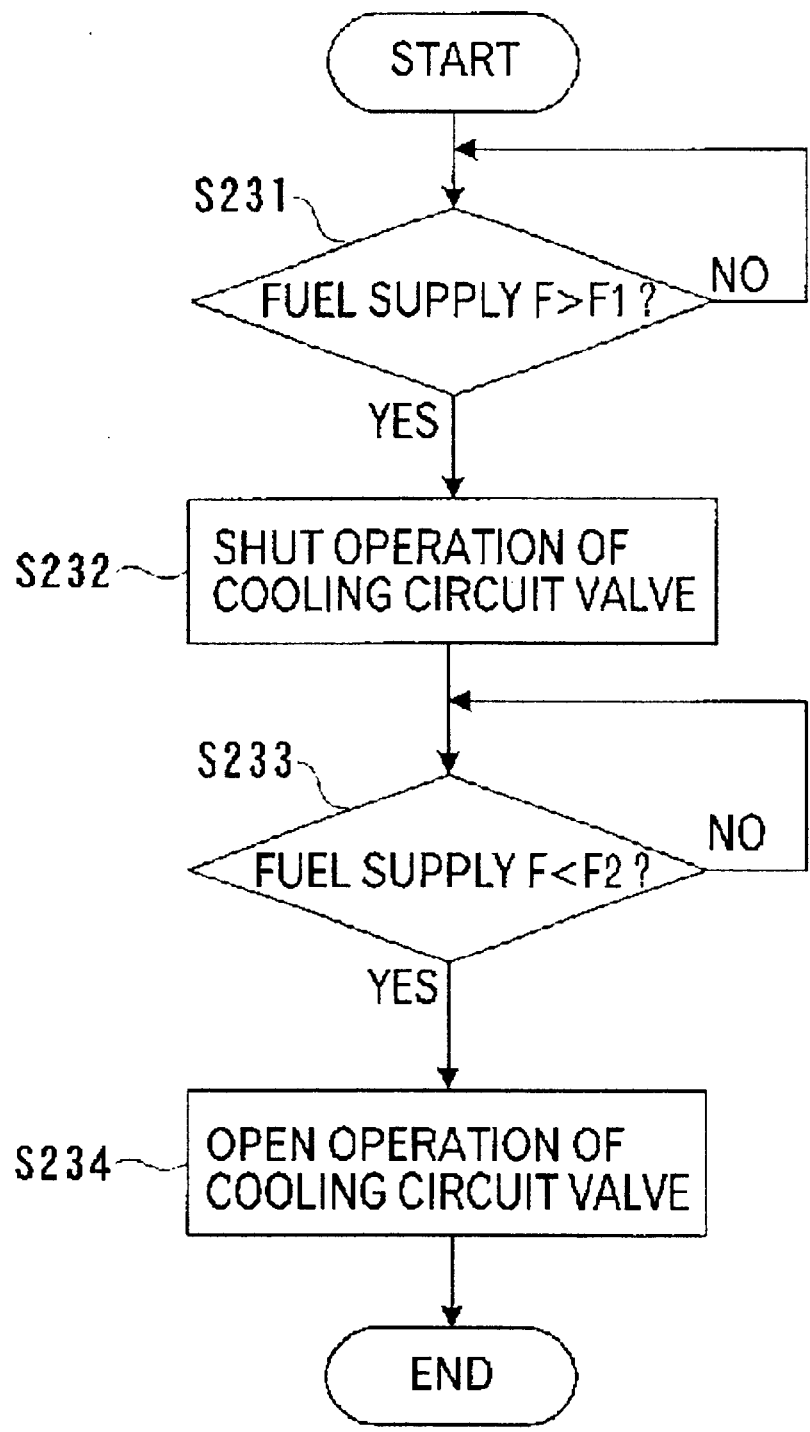
FIG. 12 is a flowchart showing an operation during rated power mode of the thermal medium circulator of the third embodiment.

Specifically, in FIG. 12, whether the fuel supply F into the cylinder has reached the predetermined fuel supply F1 or not is checked in step S231 and advances to step S232 when the fuel supply F has reached the predetermined fuel supply F1. When the fuel supply F has not reached the predetermined fuel supply F1, the fuel supply signal from the fuel supply sensor is again received by the step S231 to check whether the fuel supply F has reached the predetermined fuel supply F1 or not.

In the step S232, since the in-cylinder temperature becomes high on account of the increased amount of the fuel supply into the cylinder when the fuel supply F has reached the predetermined fuel supply F1, it is not required to warm up the diesel engine 1. Accordingly, the cooling circuit valve 725 is closed to suspend the circulation of the cooling water and the process advances to step S233.

In the step S233, whether the fuel supply F to the cylinder is less or more than a predetermined fuel supply F2 is checked and the process is advanced to step S234 when the fuel supply F to the cylinder is less than a predetermined fuel supply F2.

The predetermined fuel supply F2 is set smaller than the predetermined fuel supply F1 (F2>F1). Accordingly, even when the fuel supply F to the cylinder is fluctuated around the predetermined fuel supply F1 or the predetermined fuel supply F2 in a vibrating manner, the hunching at the cooling circuit valve 725 can be prevented.

In step S24, whether the operation mode of the diesel engine 1 is still at the rated power mode M8 or not is checked based on the operation mode signal inputted to the cooling circuit valve open/shut controller 727A. When the operation mode is still at the rated power mode M8, the process returns to the step S23 and the open/shut operation of the cooling circuit valve 725 is controlled based on the fuel amount supplied into the cylinder of the diesel engine 1.

On the other hand, when the operation mode of the diesel engine 1 is transferred from the rated power mode M8 to the other mode, the process advance to the step S21 and the respective steps from the step S21 to S24 are repeated until the operation of the diesel engine 1 is suspended.

In other words, the thermal medium circulator 72 is actuated during the period (fifth predetermined period) from the start of the starting mode M2 in starting the engine to the end of the high-idle mode M7 to warm up the diesel engine 1 as shown in FIG. 9. Further, when the operation mode of the diesel engine 1 is the rated power mode M8, the thermal medium circulator 72 conducts warm-up of the engine when there is much fuel supply F, i.e. when the load applied to the engine is high, and conducts warm-up of the engine when there is small fuel supply F, i.e. when the load applied to the engine is low. Further, the thermal medium circulator 72 warms up the diesel engine 1 when the fuel supply to the cylinder is small and the load applied to the engine is low, i.e., during the operation mode other than the rated power mode M8.

(Operation of Fuel injection timing advancing device)

When the starting switch is turned on, the rotation of the crankshaft is started by the drive source such as the motor of the starter etc. to start the diesel engine 1 and actuate the engine controller 60 and the solenoid valve controller 142.

Figure 13:
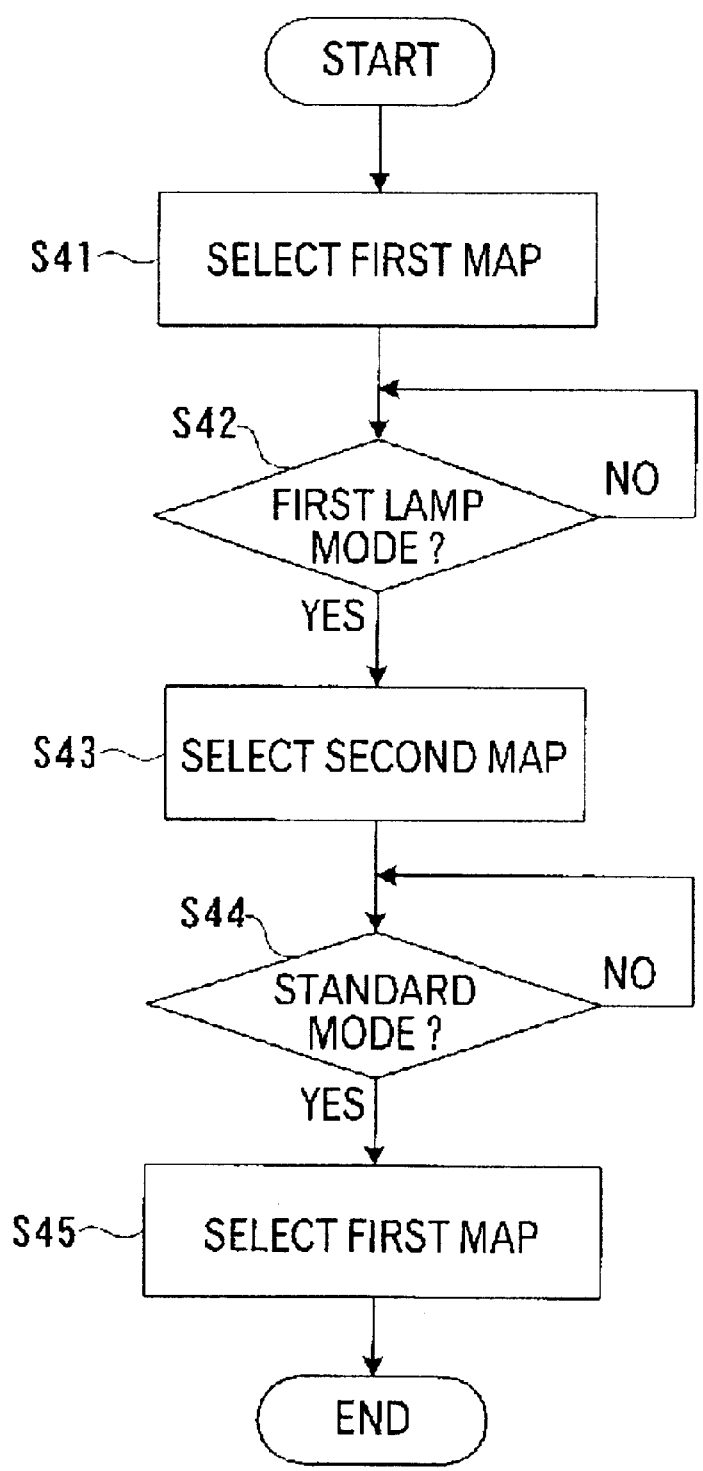
FIG. 13 is a flowchart showing an operation of fuel injection timing advancing device of the third embodiment.

In FIG. 13, when the start signal from the starting switch is inputted to the map switcher 741B of the fuel injection timing advancing controller 741, the map switcher 741B selects the first map as shown in FIG. 9, so that the fuel injection/injection-timing controller 741D controls the fuel supply timing based on the first map to advance to step S42.

The first map indicates that the advance timing control is conducted when the engine speed is low. Since the engine speed is low before the middle-idle mode M5, the advance timing control is conducted in the diesel engine 1. Accordingly, since the combustion time of the fuel is lengthened, the ignition and complete combustion of the fuel can be enhanced.

In the step S42, whether the operation mode of the diesel engine 1 has been transferred to the first lamp mode M4 or not is checked based on the operation mode signal inputted to the map switcher 741B. When the mode has been transferred to the first lamp mode M4, the process advances to step S43. On the other hand, when the process has not been transferred to the first lamp mode M4, the operation mode signal from the operation mode setting means 61 is again received in the step S42 to check whether the mode has been transferred to the first lamp mode M4 or not.

In the step S43, since the operation mode of the diesel engine 1 has been transferred to the first lamp mode M4, the map switcher 741B selects the second map as shown in FIG. 9 and the fuel-injection/injection-timing controller 741D controls the fuel supply timing based on the second map to advance to step S44.

The second map indicates that the advance timing control is conducted irrespective of the engine speed, so that the advance timing control is conducted in the diesel engine 1. Accordingly, since the fuel combustion time is lengthened, the ignition and complete combustion of the fuel can be enhanced.

In the step S44, whether the operation ode of the diesel engine 1 has been transferred to the rated power mode M8 or not is checked based on the operation mode signal inputted to the map switcher 741B, and when the operation mode has been transferred to the rated power mode M8, the process advances to step S45. On the other hand, when the operation mode has not yet transferred to the rated power mode M8, the operation mode signal from the operation mode setting means 61 is again received in the step S44 to check whether the operation mode has been transferred to the rated power mode M8 or not.

In the step S45, since the operation mode of the diesel engine 1 has been transferred to the rated power mode M8, the map switcher 741B selects the first map as shown in FIG. 9, and the fuel-injection/injection-timing controller 741D controls the fuel supply timing based on the first map until the operation of the diesel engine 1 is stopped.

Specifically, the fuel supply timing advance timing controller 741 conducts advance timing control during the period from the start of the starting mode M2 in starting the engine to the end of the low-idle mode M3 based on the first map and conducts the advance timing control during the period from the start of the first lamp mode M4 to the end of the high-idle mode M7 based on the second map. Accordingly, the diesel engine 1 is controlled in the advance timing control during the period (sixth predetermined period) from the start of the starting mode M2 in starting the engine to the end of the high-idle mode M7 to lengthen the combustion time of the fuel, so that the fuel combustion stabilization is enhanced by the fuel injection timing advancing device 74 during the period.

(Operation of Cylinder Cut-Off Device)

When the starting switch is turned on, the rotation of the crankshaft is started by the drive source such as the motor of the starter to start the diesel engine 1 and the engine controller 60 and the solenoid valve controller 142 are actuated.

Figure 14:
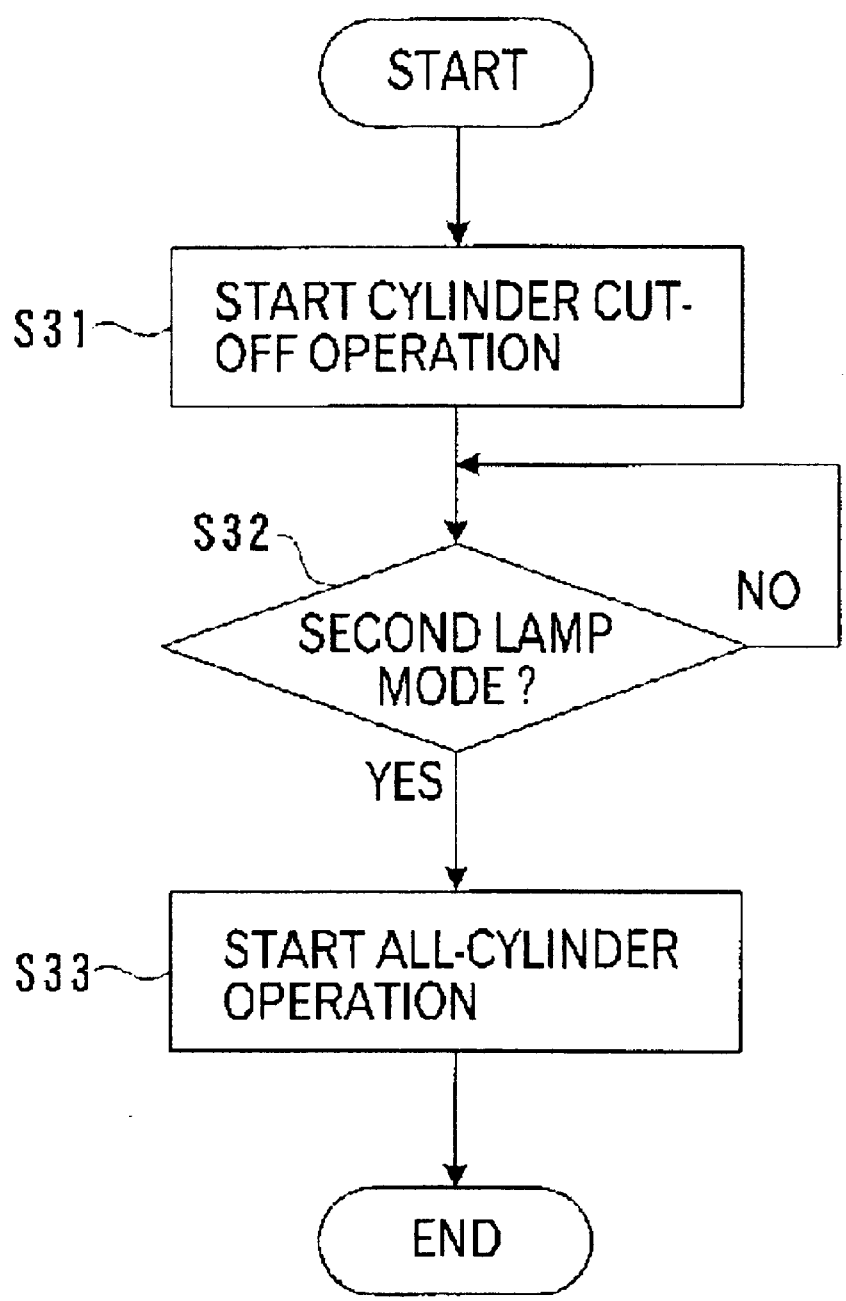
FIG. 14 is a flowchart showing an operation of cylinder cut-off device of the third embodiment.

In FIG. 14, when the start signal from the starting switch is inputted to the cylinder cut-off controller 731A of the cylinder cut-off control section 731 in step S31, the cylinder cut-off controller 731A establishes non-injection status of one of the two fuel injection pumps to conduct cylinder cut-off operation to advance to step S32 as shown in FIG. 9.

Accordingly, in the engine body 20, since the fuel supply to the cylinder of the bank on one side is suspended and the fuel supply to the cylinder of the rest of the bank is increased, the temperature of the engine body 20 is rapidly raised and ignition and complete combustion of the fuel can be enhanced.

In step S32, whether the operation mode of the diesel engine 1 has been transferred to the second lamp mode M6 is checked based on the operation mode signal inputted to the cylinder cut-off controller 731A and, when the operation mode has been transferred to the second lamp mode M6, the process advances to step S33. On the other hand, when the operation mode has not been transferred to the second lamp mode M6, the operation mode signal from the operation mode setting means 61 is again received to check whether the operation mode has been transferred to the second lamp mode M6 or not.

In the step S33, since the operation mode of the diesel engine 1 has been transferred to the second lamp mode M6, a control signal for establishing injection status of the fuel injection pump is outputted to one of the electric governors 1B to conduct all-cylinder operation. By switching from the cylinder cut-off operation to the all-cylinder operation during the second lamp mode where the engine speed is gradually raised, unpleasantness felt by user on account of change in engine sound accompanied by switching operation can be reduced.

Thereafter, all-cylinder operation is conducted until the diesel engine 1 is stopped.

In other words, the cylinder cut-off device 73 is actuated during the period (first predetermined period) from the start of the starting mode M2 in starting the engine to the halfway of the second lamp mode M6 as a preceding step of the high-idle condition as shown in FIG. 9 to warm up the diesel engine 1.

According to the above-described embodiment, following advantages can be obtained in addition to the advantages of the above-described first embodiment.

Since the five combustion stabilization assist 10, 71, 72, 73 and 74, i.e. the flow adjuster 10, the intake heating device 71, the thermal medium circulator 72, the cylinder cut-off device 73 and the fuel injection timing advancing device 74 are used in the present embodiment, stabilization of fuel combustion in the diesel engine 1 can be rapidly enhanced, so that the possibility of white smoke discharge and engine hunching can be greatly reduced.

Further, since the above five combustion stabilization assist 10, 71, 72, 73 and 74 are actuated during the period at least from the start of the first lamp mode M4 to the end of the middle-idle M5 (second predetermined period), i.e. the period where small amount of fuel is supplied into the cylinder because no or small load is applied to the diesel engine 1 and small amount of fuel is supplied into the cylinder and where the fuel combustion time is short on account of the high engine speed, fuel ignition and complete combustion can be enhanced even when only small amount of fuel is supplied into the cylinder and combustion time is short.

Further, since the five combustion stabilization assist 10, 71, 72, 73 and 74 are actuated from the starting mode M2, i.e. from the engine-start period where only small amount of the fuel is supplied into the cylinder because no-load or low-load is applied to the engine and the in-cylinder temperature is low, the fuel injection and complete combustion can be sufficiently enhanced and the startability of the diesel engine 1 can be improved.

Since the three combustion stabilization assist 71, 72 and 74, i.e. the intake heating device 71, the thermal medium circulator 72 and the fuel injection timing advancing device 74 are actuated until more than predetermined load is applied during the high-idle mode M7, in other words, until the operation mode is transferred to the rated power mode M8, the three combustion stabilization assist 71, 72 and 74 can be actuated until the fuel amount supplied into the cylinder is increased to a degree and the diesel engine 1 is substantially warmed. Accordingly, the diesel engine 1 can be sufficiently warmed, so that the ignition and complete combustion of the fuel can be sufficiently enhanced, thus preventing generation of engine hunching and discharge of white smoke.

When the operation mode of the diesel engine 1 is the rated power mode M8, the thermal medium circulator 72 does not warm up the engine when there is much fuel supply F, i.e. when the load applied to the engine is high, and warms up the engine where there is small fuel supply F, i.e. when the load applied to the engine is low. Further, the thermal medium circulator 72 warms up the diesel engine 1 when the fuel supply to the cylinder is low and there is small load applied to the engine during the operation mode other than the rated power mode M8.

Accordingly, the diesel engine 1 can be warmed by circulating heated cooling water when the in-cylinder temperature is low because small amount of fuel is supplied into the cylinder on account of low load applied to the engine, so that the ignition and complete combustion of the fuel can be enhanced. On the other hand, since the circulation of the warm cooling water is stopped when the in-cylinder temperature is high on account of the great fuel supplied into the cylinder for the high load applied to the engine, excessive temperature increase of the diesel engine 1 can be prevented.

Further, since the density of the intake air can be prevented from being lowered because the diesel engine 1 is not heated by the warm cooling water, i.e. the intake air is not heated by the water-cooled charged air cooler 33 when the load applied to the engine is high, the intake air flow supplied into the cylinder is not reduced, thereby avoiding decrease in the output of the diesel engine 1.

[Fourth Embodiment]

Figure 15:
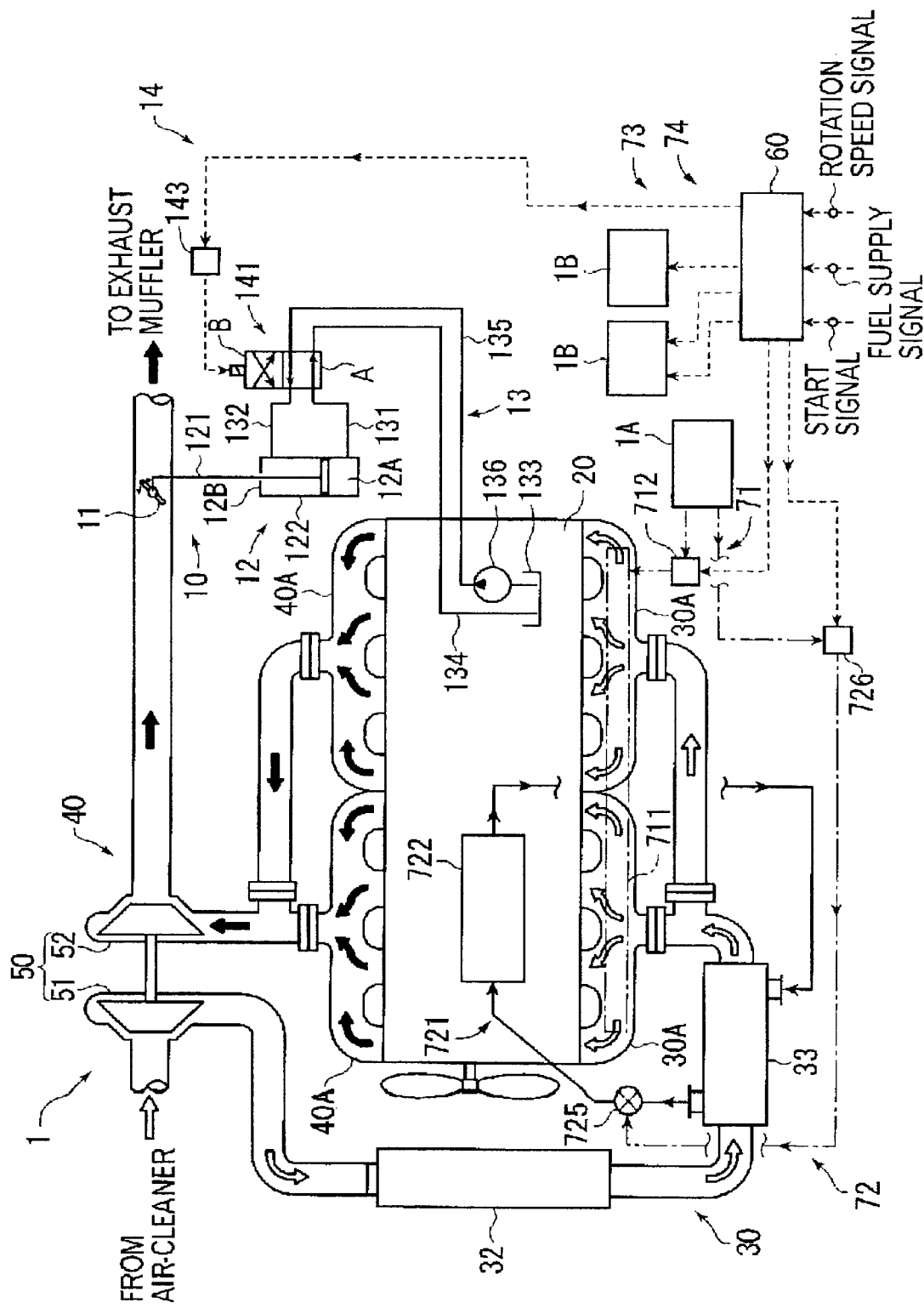
FIG. 15 is a schematic illustration of a diesel engine according to fourth embodiment of the present invention.

FIG. 15 shows fourth embodiment of the present invention. Though the open timing of the butterfly valve 11 of the flow adjuster 10 is set in accordance with the fuel supply into the cylinder in the above-described third embodiment, the open operation is set based on the operation mode signal from the operation mode setting means 61 in the present fourth embodiment.

Specifically, in the present embodiment, the engine controller 60 determines whether the exhaust flow is throttled by the butterfly valve 11 or not in accordance with the operating condition of the diesel engine 1 and a flow adjustment controller 101 installed in the engine controller 60 is provided to the flow adjuster 10 instead of the solenoid valve controller. Incidentally, though not described in detail, the operation mode setting means 61, the intake heating control section 713, the thermal medium circulation controller 727, the cylinder cut-off control section 731 and the fuel supply timing advance timing controller 741 are installed in the engine controller 60 as well as the flow adjustment controller 101 as in the above-described third embodiment.

Figure 16:
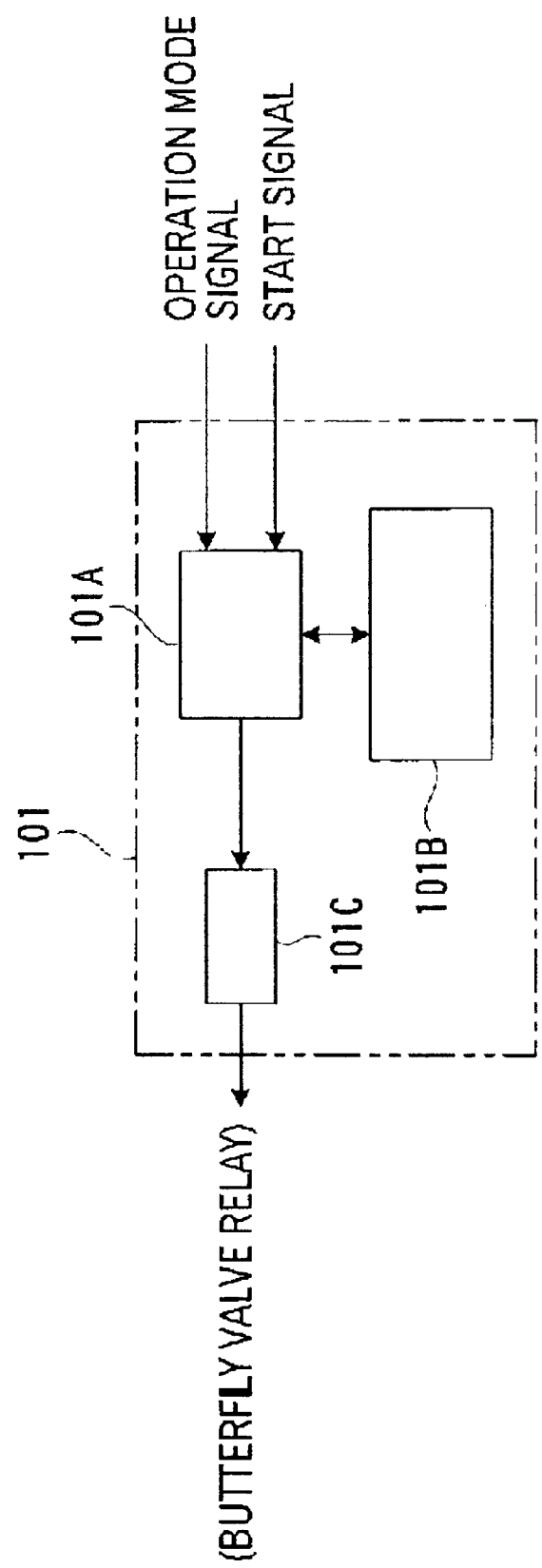
FIG. 16 is a block diagram showing a flow adjustment controller of the fourth embodiment.

In FIG. 16, the flow adjustment controller 101 has an exhaust throttle controller 101A for determining ON/OFF operation of the (butterfly valve) relay 143, an exhaust throttle timing storage 101B storing the most appropriate timing for throttling the exhaust by the butterfly valve 11, and a timer 101C for turning off the relay 143 when a predetermined time is elapsed after the relay 143 is turned on.

Here, the diesel engine 1 is controlled so that the exhaust is throttled when the in-cylinder temperature is low on account of small amount fuel supply into the cylinder and exhaust throttle is released when there is much fuel supply into the cylinder and the in-cylinder temperature is high.

In the diesel engine 1, the exhaust throttle controller 101A outputs a control signal to the relay 143 for turning on the relay 143 in order to shut the butterfly valve 11 when the fuel supply to the cylinder is small and the in-cylinder temperature is low and outputs a control signal to the relay 143 for turning off the relay 143 in order to open the butterfly valve 11 when there is much fuel supplied into the cylinder and the in-cylinder temperature is high. Further, the timer 101C starts counting time when the relay 143 is turned on and outputs a control signal to the relay 143 for turning off the relay 143 for closing the butterfly valve 11 after a predetermined time is elapsed.

Next, an operation of the flow adjuster according to the present embodiment will be described below with reference to the flowchart shown in FIG. 17.

When the starting switch is turned on, the rotation of the crankshaft is started by the drive source such as a motor of the starter to start the diesel engine 1 and actuate the engine controller 60.

Figure 17:
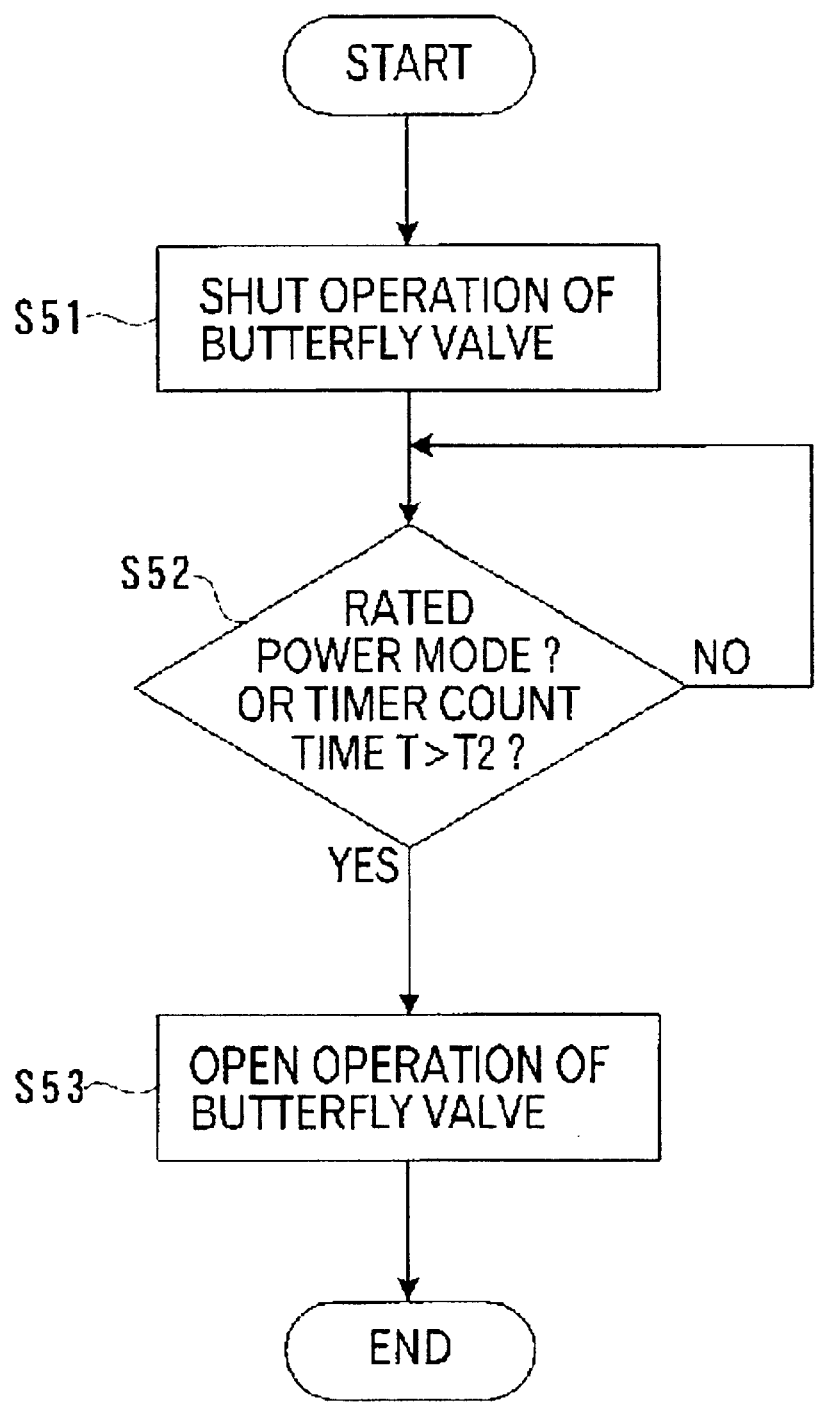
FIG. 17 is a flowchart showing an operation of the flow adjuster of the fourth embodiment.
Figure 18:
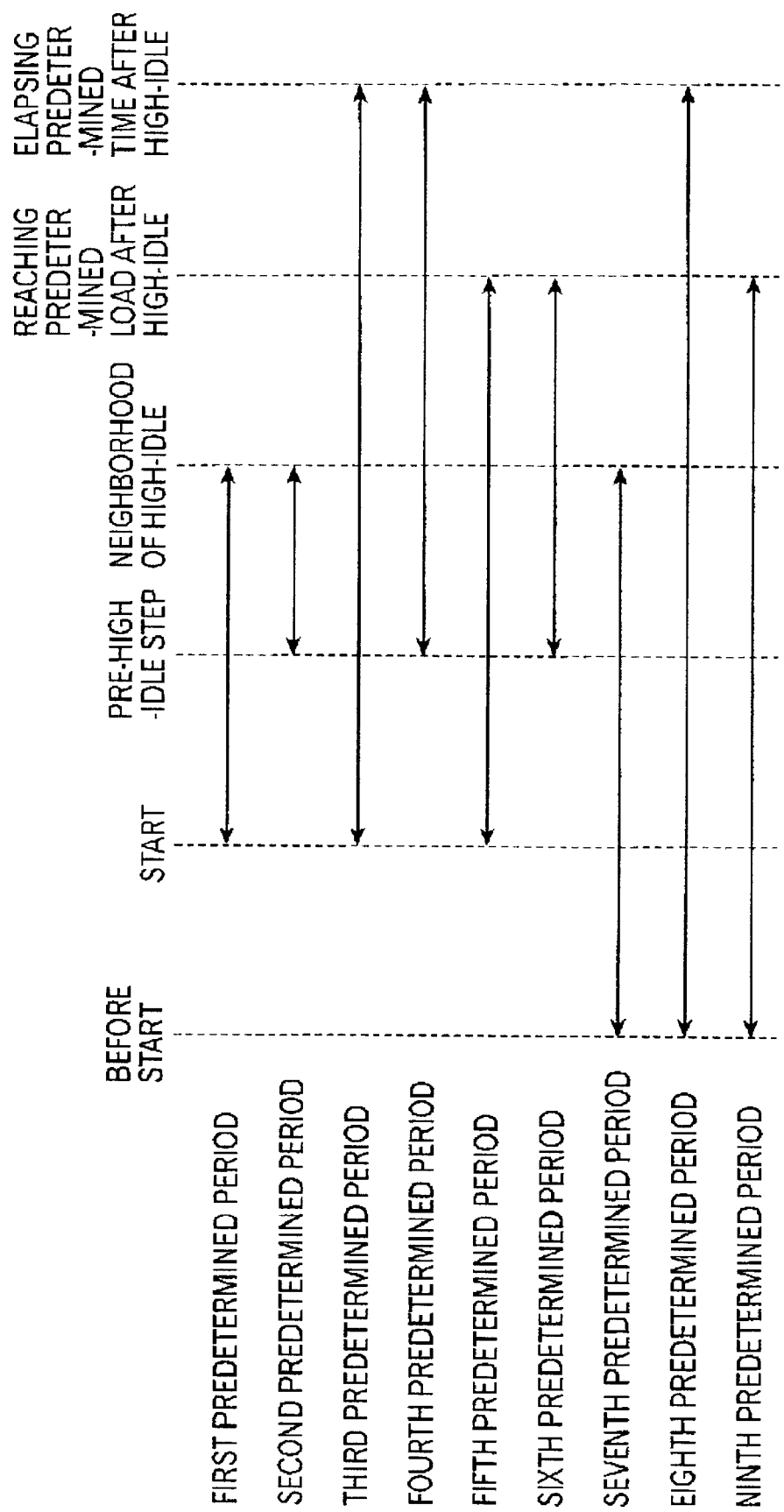
FIG. 18 is an illustration showing first to ninth predetermined periods.

In FIG. 17, when the start signal from the starting switch is inputted to the exhaust throttle controller 101A of the flow adjustment controller 101 in step S51, the exhaust throttle controller 101A shuts the butterfly valve 11 to throttle the exhaust flow to advance to step S52 as shown in FIG. 9.

Accordingly, since a part of the exhaust is reserved in the cylinder and the amount of intake air inhaled into the cylinder is reduced, the heat quantity given to the cylinder by the high-temperature exhaust is increased and the heat quantity taken away from the inside of the cylinder by the low-temperature intake air is reduced, so that the in-cylinder temperature is rapidly raised to enhance ignition and complete combustion of the fuel.

In the step S52, whether the operation mode of the diesel engine 1 is transferred to the rated power mode M8 or not is checked based on the operation mode signal inputted to the exhaust throttle controller 101A and whether the count time T counted by the timer 101C has reached the predetermined count time T2 or not is checked.

When the operation mode of the diesel engine 1 has been transferred to the rated power mode M8 and/or when the count time T has reached the predetermined count time T2, i.e. when more than predetermined load is applied to the diesel engine 1 to increase the fuel amount supplied into the cylinder so that the diesel engine is sufficiently warmed and/or when the exhaust is throttled for substantially long period, the operation advances to step S53.

On the other hand, when the operation mode of the diesel engine 1 has not been transferred to the rated power mode M8 and/or when the count time T has not reached the predetermined count time T2, the operation mode signal from the operation mode setting means 61 is again received in the step S52 to check whether the operation mode has been transferred to the rated power mode M8 or not and whether the count time T has reached the predetermined count time T2 or not.

In the step S53, when the operation mode of the diesel engine 1 has been transferred to the rated power mode M8, since more than predetermined load is applied to the diesel engine 1 and the fuel supplied into the cylinder is increased sot that the diesel engine 1 is sufficiently warmed, the butterfly valve 11 is opened to release exhaust throttle, as shown in FIG. 9.

On the other hand, even when the operation mode of the diesel engine 1i has not been transferred to the rated power mode M8, when the count time T has reached the predetermined count time T2, since the exhaust is throttled for substantially long time, the butterfly valve 11 is opened to release the exhaust throttle so as not to apply excessive load to the diesel engine 1 by throttling the exhaust.

Thereafter, the butterfly valve 11 is opened to release the exhaust throttle until the diesel engine 1 is suspended and restarted.

In other words, as shown in FIG. 9, the flow adjuster is actuated during the period (first predetermined period) from the start of the starting mode M2 in starting the engine to the end of the high-idle mode M7 to heat the intake air.

According to the above-described present embodiment, following advantages as well as the advantages of the above-described third embodiment can be obtained.

Since the flow adjuster 10 is actuated until more than predetermined load is applied in the high-idle mode M7, i.e. until the operation mode is transferred to the rated power mode M8, the diesel engine 1 can be warmed by the flow adjuster until the diesel engine 1 is substantially warmed by increasing the amount of fuel supplied into the cylinder. Accordingly, since the diesel engine 1 is sufficiently warmed, the ignition and complete combustion of the fuel can be sufficiently enhanced, thus preventing generation of engine hunching and discharge of white smoke.

[Modifications]

Incidentally, the scope of the present invention is not restricted to the above specific embodiments, but includes modifications and improvement as long as an object of the present invention can be achieved.

Figure 3:
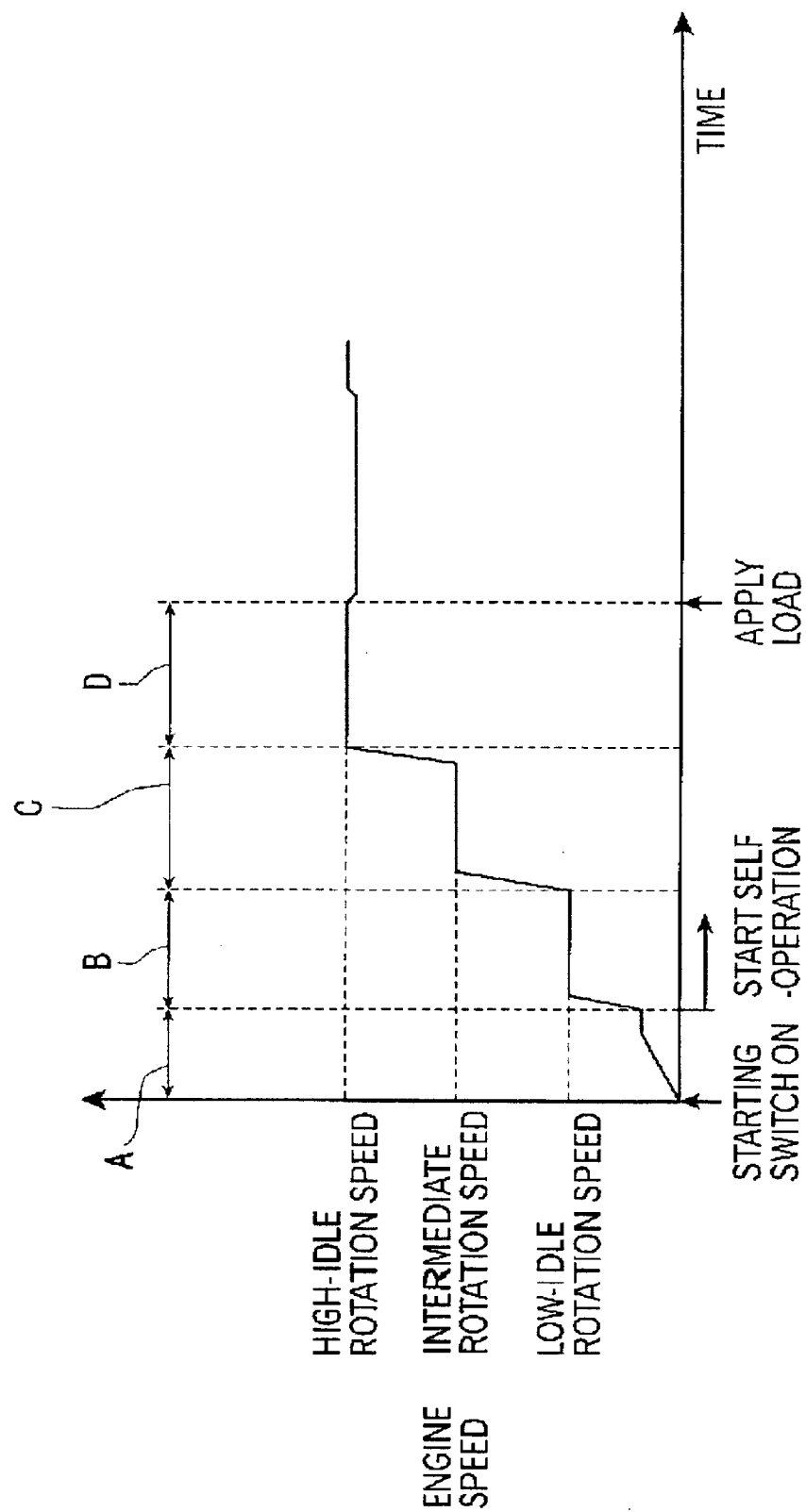
FIG. 3 is an illustration showing an operating condition of diesel engine according to the first embodiment.

For instance, the period for throttling the diesel engine may be throttled, when described using FIG. 3, during the period after the cranking section A (i.e. after starting self-operation) to the high-idle rotation speed section D, from the low-idle rotation speed section B to the high-idle rotation speed section D, or from the middle-rotation speed section C to the high-idle rotation speed section D. Further, it is not necessary to throttle the exhaust flow for the entire high-idle rotation speed section D, but the throttling of the exhaust flow may be released at the halfway of the section D. The throttling of the exhaust flow may be released during the middle-rotation speed section C at the transition period from the middle-rotation speed to the high-idle rotation speed.

Especially, when the exhaust flow of the diesel engine is throttled within the period from the middle-rotation speed section C to the high-idle rotation speed section D, since the intake or exhaust flow is throttled when there is large amount of exhaust flow from the diesel engine, impurities such as carbon in the exhaust can be prevented from being stuffed between the flow adjuster and the exhaust channel. Accordingly, the frequency for cleaning around the flow adjuster can be reduced.

The diesel engine may use fuel such as waste plastic decomposition oil, methanol fuel, light oil etc., and may be of natural intake without conducting supercharge.

Other valves such as gate valve may be used as the flow adjuster.

The open/shut drive method of the flow adjuster is not restricted to hydraulic type, but may be fluid type such as pneumatic type, electrical type and mechanical type.

The flow adjuster may be provided at the halfway of the intake channel. According to such arrangement, the flow of the intake air is adjusted by the flow adjuster to obtain the same function and advantage as in adjusting the exhaust flow.

The load condition of the diesel engine may be detected not only by detecting the load in accordance with the fuel injection into the cylinder, but by detecting the load with a torque meter provided to an engine shaft such as the crankshaft, by detecting the load according to the output of the power generator driven by the diesel engine or by detecting the load according to the open degree of the accelerator of vehicle driven by the diesel engine.

The flow adjuster 10, the intake heating device 71, and the thermal medium circulator 72 may be actuated in any periods out of the first to the ninth predetermined periods, and the cylinder cut-off device 73 and the fuel injection timing advancing device 74 may be driven in any periods out of the first to the sixth predetermined periods.

The start time of the first predetermined period, the third predetermined period and the fifth predetermined period may be set at any time during the starting mode M2 or the cranking section A.

The step before reaching the high-idle in the second, the fourth and the sixth predetermined periods may be any one of the low-idle mode M3, the first lamp mode M4, the middle-idle mode M5, the second lamp mode M6, the low-idle rotation speed section B and the middle-rotation speed section C.

The neighborhood of high-idle of the first, the second and the seventh predetermined periods may be any time during the second lamp mode M6, the high-idle mode M7 or the high-idle rotation speed section D.

Actuation before starting the seventh, the eighth and the ninth predetermined periods means, for instance, closing the butterfly valve 11 before starting the diesel engine 1 in the flow adjuster 10, generating heat by the intake heater 711 before starting the diesel engine 1 in the intake heating device 71 and opening the cooling circuit valve 725 in advance in the thermal medium circulator 72. Incidentally, in the above arrangement, the intake heater is connected to a power source other than the battery 1A of the diesel engine 1 in the intake heating device 71, and the water pump and the cooling circuit valve 725 is connected to the power source other than the battery 1A of the diesel engine 1 in the thermal medium circulator 72.

The diesel engine is not restricted to include the five combustion stabilization assist of flow adjuster 10, the intake heating device 71, the thermal medium circulator 72, the cylinder cut-off device 73 and the fuel injection timing advancing device 74, but may be an engine having at least one of the combustion stabilization assist.

What is claimed is:

1. A diesel engine (1), comprising: a combustion stabilization assist (10, 71, 72, 73, 74) for enhancing stabilization of combustion of fuel supplied into a combustion chamber, the combustion stabilization assist (10, 71, 72, 73, 74) being actuated for a predetermined period in accordance with operating condition of the diesel engine (1).

wherein the predetermined period is either one of a first predetermined period from starting the diesel engine (1) until the diesel engine (1) reaches a neighborhood of high-idle condition and a second predetermined period from a pre-high-idle step before the condition of the diesel engine (1) reaches the high-idle condition until the condition of the diesel engine (1) reaches the neighborhood of the high-idle condition.

2. The diesel engine according to claim 1, wherein the combustion stabilization assist (10) includes a flow adjuster (11) provided at the halfway of an intake channel (30) or an exhaust channel (40) of the diesel engine (1) for adjusting a flow of an intake air or an exhaust flowing through the channels (30, 40) and a flow adjustment controller (14) for controlling the operation of the flow adjuster (11), and wherein the flow adjustment controller (14) controls the operation of the flow adjuster (11) so that the flow of the intake air or the exhaust is throttled during the predetermined periods.

3. The diesel engine (1) according to claim 2, wherein the pre-high-idle step of the high-idle condition is when a rotation speed of the engine becomes an approximately middle-rotation speed between a low-idle rotation speed and high-idle rotation speed of the diesel engine (1).

4. The diesel engine (1) according to claim 1, wherein the combustion stabilization assist (71) includes an intake heater (711) for heating the intake air of the diesel engine (1).

5. The diesel engine (1) according to claim 1, wherein the combustion stabilization assist (72) includes:
   a temperature adjuster (721) for adjusting the temperature of the diesel engine (1) by circulating a thermal medium;
   a thermal medium heater (722) for heating the thermal medium of the temperature adjuster (721);

a flow-path opener/shutter for opening and shutting a flow-path of the thermal medium of the temperature adjuster (721); and a flow-path open/shut controller (727) for controlling the operation of the flow-path opener/shutter (725) so that the flow-path of the thermal medium is opened during the predetermined period.

6. The diesel engine (1) according to claim 5, wherein the flow-path open/shut controller (727) controls the operation of the flow-path opener/shutter (725) so that the flow-path of the thermal medium is opened when a load applied to the engine is low and the flow-path of the thermal medium is shut when the load applied to the engine is high.

7. The diesel engine (1) according to claim 1, wherein the diesel engine (1) includes a plurality of combustion chambers, and wherein the combustion stabilization assist (73) has a function for stopping fuel supply to a part of combustion chamber of the plurality of combustion chambers.

8. The diesel engine (1) according to claim 1, wherein the combustion stabilization assist (74) has a function for advancing a timing for supplying fuel to the combustion chamber to be earlier than the a timing for supplying fuel during loaded operation mode of the diesel engine (1).

9. The diesel engine (1) according to claim 1, wherein fuel of inferior autoignition properties is used.

10. A diesel engine (1), comprising: a combustion stabilization assist (10, 71, 72, 73, 74) for enhancing stabilization of combustion of fuel supplied into a combustion chamber, the combustion stabilization assist (10, 71, 72, 73, 74) being actuated for a predetermined period in accordance with operating condition of the diesel engine (1), wherein the predetermined period is either one of a third predetermined period from starting the diesel engine (1) until a predetermined time has elapsed after the diesel engine (1) reaches a high-idle condition and a fourth predetermined period from a pre-high-idle step before the condition of the diesel engine (1) reaches the high-idle condition until a predetermined time has elapsed after the diesel engine (1) reaches the high-idle condition, and/or either one of a fifth predetermined period from starting the diesel engine (1) until a predetermined load is applied to the engine after the diesel engine (1) reaches the high-idle condition and a sixth predetermined period from a pre-high-idle step before the condition of the diesel engine (1) reaches the high-idle condition until a predetermined load is applied to the engine after the diesel engine (1) reaches the high-idle condition.

11. The diesel engine according to claim 10, wherein the combustion stabilization assist (10) includes a flow adjuster (11) provided at the halfway of an intake channel (30) or an exhaust channel (40) of the diesel engine (1) for adjusting a flow of an intake air or an exhaust flowing through the channels (30, 40) and a flow adjustment controller (14) for controlling the operation of the flow adjuster (11), and wherein the flow adjustment controller (14) controls the operation of the flow adjuster (11) so that the flow of the intake air or the exhaust is throttled during the predetermined periods.

12. The diesel engine (1) according to claim 11, wherein the pre-high-idle step of the high-idle condition is when a rotation speed of the engine becomes an approximately middle-rotation speed between a low-idle rotation speed and high-idle rotation speed of the diesel engine (1).

13. The diesel engine (1) according to claim 10, wherein the combustion stabilization assist (71) includes an intake heater (711) for heating the intake air of the diesel engine (1).

14. The diesel engine (1) according to claim 10, wherein the combustion stabilization assist (72) includes:

a temperature adjuster (721) for adjusting the temperature of the diesel engine (1) by circulating a thermal medium;

a thermal medium heater (722) for heating the thermal medium of the temperature adjuster (721);

a flow-path opener/shutter for opening and shutting a flow-path of the thermal medium of the temperature adjuster (721); and a flow-path open/shut controller (727) for controlling the operation of the flow-path opener/shutter (725) so that the flow-path of the thermal medium is opened during the predetermined period.

15. The diesel engine (1) according to claim 14, wherein the flow-path open/shut controller (727) controls the operation of the flow-path opener/shutter (725) so that the flow-path of the thermal medium is opened when a load applied to the engine is low and the flow-path of the thermal medium is shut when the load applied to the engine is high.

16. The diesel engine (1) according to claim 10, wherein the diesel engine (1) includes a plurality of combustion chambers, and wherein the combustion stabilization assist (73) has a function for stopping fuel supply to a part of combustion chamber of the plurality of combustion chambers.

17. The diesel engine (1) according to claim 10, wherein the combustion stabilization assist (74) has a function for advancing a timing for supplying fuel to the combustion chamber to be earlier than the a timing for supplying fuel during loaded operation mode of the diesel engine (1).

18. The diesel engine (1) according to claim 10, wherein fuel of inferior autoignition properties is used.

19. A diesel engine (1), comprising: a combination stabilization assist (10, 71, 72) for enhancing stabilization of combustion of fuel supplied into a combustion chamber, the combustion stabilization assist (10, 71, 72) being actuated for a predetermined period in accordance with operating condition of the diesel engine (1), wherein the predetermined period is a seventh predetermined period from before starting the diesel engine (1) until the diesel engine (1) reaches a neighborhood of high-idle condition.

20. The diesel engine according to claim 19, wherein the combustion stabilization assist (10) includes a flow adjuster (11) provided at the halfway of an intake channel (30) or an exhaust channel (40) of the diesel engine (1) for adjusting a flow of an intake air or an exhaust flowing through the channels (30, 40) and a flow adjustment controller (14) for controlling the operation of the flow adjuster (11), and wherein the flow adjustment controller (14) controls the operation of the flow adjuster (11) so that the flow of the intake air or the exhaust is throttled during the predetermined periods.

21. The diesel engine (1) according to claim 20,
wherein the pre-high-idle step of the high-idle condition is when a rotation speed of the engine becomes an approximately middle-rotation speed between a low-idle rotation speed and high-idle rotation speed of the diesel engine (1).

22. The diesel engine according to claim 19,
wherein the combustion stabilization assist (71) includes an intake heater (711) for heating the intake air of the diesel engine (1).

23. The diesel engine (1) according to claim 19,
wherein the combustion stabilization assist (72) includes:
a temperature adjuster (721) for adjusting the temperature of the diesel engine (1) by circulating a thermal medium;
a thermal medium heater (722) for heating the thermal medium of the temperature adjuster (721);
a flow-path opener/shutter for opening and shutting a flow-path of the thermal medium of the temperature adjuster (721); and
a flow-path open/shut controller (727) for controlling the operation of the flow-path opener/shutter (725) so that the flow-path of the thermal medium is opened during the predetermined period.

24. The diesel engine (1) according to claim 23,
wherein the flow-path open/shut controller (727) controls the operation of the flow-path opener/shutter (725) so that the flow-path of the thermal medium is opened when a load applied to the engine is low and the flow-path of the thermal medium is shut when the load applied to the engine is high.

25. The diesel engine (1) according to claim 19,
wherein fuel of inferior autoignition properties is used.

26. A diesel engine (1), comprising: a combustion stabilization assist (10, 71, 72) for enhancing stabilization of combustion of fuel supplied into a combustion chamber,
the combustion stabilization assist (10, 71, 72) being actuated for a predetermined period in accordance with operating condition of the diesel engine (1),
wherein the predetermined period is an eighth predetermined period from before starting the diesel engine (1) until a predetermined time has elapsed after the diesel engine (1) reaches a high-idle condition and/or a ninth predetermined period from before starting the diesel engine (1) until a predetermined load is applied to the engine after the diesel engine (1) reaches the high-idle condition.

27. The diesel engine according to claim 26,
wherein the combustion stabilization assist (10) includes a flow adjuster (11) provided at the halfway of an intake channel (30) or an exhaust channel (40) of the diesel engine (1) for adjusting a flow of an intake air or an exhaust flowing through the channels (30, 40) and a flow adjustment controller (14) for controlling the operation of the flow adjuster (11), and
wherein the flow adjustment controller (14) controls the operation of the flow adjuster (11) so that the flow of the intake air or the exhaust is throttled during the predetermined periods.

28. The diesel engine (1) according to claim 27,
wherein the pre-high-idle step of the high-idle condition is when a rotation speed of the engine becomes an approximately middle-rotation speed between a low-idle rotation speed and high-idle rotation speed of the diesel engine (1).

29. The diesel engine (1) according to claim 26,
wherein the combustion stabilization assist (71) includes an intake heater (711) for heating the intake air of the diesel engine (1).

30. The diesel engine (1) according to claim 26,
wherein the combustion stabilization assist (72) includes:
a temperature adjuster (721) for adjusting the temperature of the diesel engine (1) by circulating a thermal medium;
a thermal medium heater (722) for heating the thermal medium of the temperature adjuster (721);
a flow-path opener/shutter for opening and shutting a flow-path of the thermal medium of the temperature adjuster (721); and
a flow-path open/shut controller (727) for controlling the operation of the flow-path opener/shutter (725) so that the flow-path of the thermal medium is opened during the predetermined period.

31. The diesel engine (1) according to claim 30,
wherein the flow-path open/shut controller (727) controls the operation of the flow-path opener/shutter (725) so that the flow-path of the thermal medium is opened when a load applied to the engine is low and the flow-path of the thermal medium is shut when the load applied to the engine is high.

32. The diesel engine (1) according to claim 26,
wherein fuel of inferior autoignition properties is used.

* * * * *